United States Patent [19]

Shutoh et al.

[11] Patent Number: 5,754,792
[45] Date of Patent: May 19, 1998

[54] SWITCH CIRCUIT COMPRISED OF LOGICALLY SPLIT SWITCHES FOR PARALLEL TRANSFER OF MESSAGES AND A PARALLEL PROCESSOR SYSTEM USING THE SAME

[75] Inventors: Shinichi Shutoh, Kokubunji; Junji Nakagoshi; Naoki Hamanaka, both of Tokyo; Shigeo Takeuchi, Hanno; Teruo Tanaka, Hachioji, all of Japan

[73] Assignees: Hitachi, Ltd.; Hitachi VLSI Engineering Corp., both of Tokyo, Japan

[21] Appl. No.: 34,359

[22] Filed: Mar. 19, 1993

Related U.S. Application Data

[63] Continuation-in-part of Ser. No. 916,630, Jul. 22, 1992.

[30] Foreign Application Priority Data

Mar. 19, 1992 [JP] Japan .................... 4-063068

[51] Int. Cl.[6] ..................... G06F 15/173; G06F 13/00
[52] U.S. Cl. .............. 395/200.73; 395/312; 395/800.11; 395/200.79
[58] Field of Search ................... 395/200, 325, 395/200.02, 200.03, 200.12, 200.15, 800, 311, 312, 200.79, 200.31, 200.57, 200.73, 800.11; 370/60.1; 340/825.02, 825.03

[56] References Cited

U.S. PATENT DOCUMENTS

| | | | |
|---|---|---|---|
| 4,709,327 | 11/1987 | Hillis et al. | 364/200 |
| 4,985,830 | 1/1991 | Atac et al. | 395/200.15 |
| 5,138,611 | 8/1992 | Carn et al. | 370/60 |
| 5,179,552 | 1/1993 | Chao | 370/60 |
| 5,226,125 | 7/1993 | Balmer et al. | 395/325 |
| 5,339,396 | 8/1994 | Muyamatsu et al. | 395/325 |
| 5,377,333 | 12/1994 | Nakayoshi et al. | 395/325 |

FOREIGN PATENT DOCUMENTS

| | | |
|---|---|---|
| 40 19 040 | of 0000 | Germany . |
| 4019040A1 | of 0000 | Germany . |
| 25 45 976 B1 | 11/1976 | Germany . |

OTHER PUBLICATIONS

*IEEE Journal on Selected Areas in Communications*, "Practical Implementation and Packaging Technologies for a Large–Scale ATM Switching System", A. Itoh, et al., vol. 9, No. 8, Oct. 1991.

*IEEE Journal on Selected Areas in Communications*, "A Reconfigurable ATM Switch for Fault Tolerance and Traffic Balancing", Shih–Chian Yang, et al., vol. 9, No. 8, Oct. 1991.

*Primary Examiner*—Alyssa H. Bowler
*Assistant Examiner*—Mark H. Rinehart
*Attorney, Agent, or Firm*—Antonelli, Terry, Stout, & Kraus, LLP

[57] ABSTRACT

A parallel processor system including a plurality of processors. When packets of same destination PE number are inputted from different ports, the destination PE number is added with ID numbers of leading ports of split crossbar switches to which the different input ports belong, respectively, by using respective addition circuits, to thereby determine a transfer destination output port for the packets. A plurality of the split crossbar switches having different numbers of input/output ports are realized by partitioning a crossbar switch. By means of an input port select circuit provided in association with each of the output ports, an output request for the packet from the input port belonging to the split crossbar switch to which the associated output port belongs is accepted, while output requests for the packets from the input ports belonging to the other split crossbar switches are inhibited from being accepted, whereby transfer of broadcast packets are inhibited between the split crossbar switches belonging to a physically same crossbar switch. Such situation can be evaded in which same broadcast packets arrive at one and the same processor a number of times.

31 Claims, 14 Drawing Sheets

FIG. 5

| 9-INPUT/9-OUTPUT CROSSBAR SWITCH | | PHYSICAL INPUT / OUTPUT PORT NUMBER | | | | | | | | |
|---|---|---|---|---|---|---|---|---|---|---|
| | | 0 | 1 | 2 | 3 | 4 | 5 | 6 | 7 | 8 |
| 401-0 | LOGICAL PORT NUMBER | X00 | X10 | Y10 | Y11 | Y12 | Y13 | Y14 | X01 | X11 |
| | CROSSBAR TYPE REGISTER | 0 | 0 | 1 | 1 | 1 | 1 | 1 | 0 | 0 |
| | CORDINATES TRANSFORMING VALUE | 0 | 0 | 2 | 2 | 2 | 2 | 2 | 0 | 0 |
| | PARTITION INFORMATION REGISTER | 11000000 | ↓ | 00111100 | ↓ | ↓ | ↓ | ↓ | 00000011 | ↓ |
| 401-1 | LOGICAL PORT NUMBER | X02 | X12 | Y00 | Y01 | Y02 | Y03 | Y04 | X03 | X13 |
| | CROSSBAR TYPE REGISTER | 0 | 0 | 1 | 1 | 1 | 1 | 1 | 0 | 0 |
| | CORDINATES TRANSFORMING VALUE | 0 | 0 | 2 | 2 | 2 | 2 | 2 | 0 | 0 |
| | PARTITION INFORMATION REGISTER | 11000000 | ↓ | 00111100 | ↓ | ↓ | ↓ | ↓ | 00000011 | ↓ |
| 401-2 | LOGICAL PORT NUMBER | X04 | X14 | — | — | — | — | — | — | — |
| | CROSSBAR TYPE REGISTER | 0 | 0 | — | — | — | — | — | — | — |
| | CORDINATES TRANSFORMING VALUE | 0 | ↓ | — | — | — | — | — | — | — |
| | PARTITION INFORMATION REGISTER | 11000000 | — | — | — | — | — | — | — | — |

FIG. 12A

| INPUT INFORMATION | | | OUTPUT INFORMATION |
|---|---|---|---|
| BC | XADR = X-PORT NO.? | YADR = Y-PORT NO.? | OUTPUT PORT ID |
| NO | NO | NO | PORT X |
| NO | NO | YES | PORT X |
| NO | YES | NO | PORT Y |
| NO | YES | YES | PORT PE |
| YES | YES/NO | YES/NO | PORT X |

FIG. 12B

| INPUT INFORMATION | | | OUTPUT INFORMATION |
|---|---|---|---|
| BC | XADR = X-PORT NO.? | YADR = Y-PORT NO.? | OUTPUT PORT ID |
| NO | YES/NO | NO | PORT Y |
| NO | YES/NO | YES | PORT PE |
| YES | YES/NO | YES/NO | PORT Y |

FIG. 12C

| INPUT INFORMATION | | | OUTPUT INFORMATION |
|---|---|---|---|
| BC | XADR = Y-PORT NO.? | YADR = Y-PORT NO.? | OUTPUT PORT ID |
| YES/NO | YES/NO | YES/NO | PORT PE |

FIG. 16

| PORT NO. | MODE | | | |
|---|---|---|---|---|
| | 00 | 01 | 10 | 11 |
| 0~n/8-1 | 0~n-1 | 0~n/2-1 | 0~n/4-1 | 0~n/8-1 |
| n/8~2n/8-1 | 0~n-1 | 0~n/2-1 | 0~n/4-1 | n/8~2n/8-1 |
| 2n/8~3n/8-1 | 0~n-1 | 0~n/2-1 | n/4~2n/4-1 | 2n/8~3n/8-1 |
| 3n/8~4n/8-1 | 0~n-1 | 0~n/2-1 | n/4~2n/4-1 | 3n/8~4n/8-1 |
| 4n/8~5n/8-1 | 0~n-1 | n/2~n-1 | 2n/4~3n/4-1 | 4n/8~5n/8-1 |
| 5n/8~6n/8-1 | 0~n-1 | n/2~n-1 | 2n/4~3n/4-1 | 5n/8~6n/8-1 |
| 6n/8~7n/8-1 | 0~n-1 | n/2~n-1 | 3n/4~n-1 | 6n/8~7n/8-1 |
| 7n/8~n-1 | 0~n-1 | n/2~n-1 | 4n/4~n-1 | 7n/8~n-1 |

SWITCH CIRCUIT COMPRISED OF LOGICALLY SPLIT SWITCHES FOR PARALLEL TRANSFER OF MESSAGES AND A PARALLEL PROCESSOR SYSTEM USING THE SAME

CROSS-REFERENCE TO RELATED APPLICATION

The present application is a continuation-in part of copending U.S. application Ser. No. 07/916,630 filed on Jul. 22, 1992 entitled "PARTIAL BROADCAST METHOD IN PARALLEL COMPUTER AND A PARALLEL COMPUTER SUITABLE THEREFOR" by Shinichi SHUTOH, et al. and assigned to the present assignees, the contents of which are incorporated herein by reference.

BACKGROUND OF THE INVENTION

The present invention relates to a switch circuit for packet transfer and a parallel processor system in which a plurality of processors (also referred to as processor elements or PE in abbreviation) are interconnected through a network constituted by a plurality of the packet transfer switch circuits.

There are known a variety of parallel processor network systems. Among them, a crossbar switch network constituted by a great number of interconnected crossbar switches attracts attention because of high data transfer rate or speed. A typical one of such crossbar switch networks is disclosed in JP-A-63-124162. The crossbar switch network can be implemented in a structure of given dimensions. However, for convenience of description, a two-dimensional crossbar switch network will be considered.

The two dimensional crossbar switch network includes a plurality of processors or PEs disposed in a two-dimensional matrix-like array, a plurality of row crossbar switches each for interconnecting the processors belonging to a same row, and a plurality of column crossbar switches each for interconnecting the processors belonging to a same column. Accordingly, when the number of processor columns differs from that of the processor rows, a plurality of different types of crossbar switches which differ from one another in respect to the number of input/output ports have to be used, as a result of which overhead involved in the design process is increased, giving rise to a problem. Further, when the number of processors is to be increased or decreased, the crossbar switches have to be changed in correspondence to the number of the processors increased or decreased, to another disadvantage.

SUMMARY OF THE INVENTION

An object of the present invention is to provide a switch circuit which can easily be split or partitioned into a plurality of split switch circuits and a parallel processor system in which the split switch circuits are sued.

It is another object of the present invention to provide a switch circuit which can be split into a plurality of split switches having mutually different numbers of input/output ports and a parallel processor system in which a plurality of these split switches are employed.

A further object of the present invention is to provide a switch circuit which can be split into a plurality of split switches and which is nevertheless capable of broadcasting messages and a parallel processor system in which a plurality of these split switches are employed.

It is yet another object of the present invention to provide a switch circuit which can be partitioned into a plurality of split switch circuits and which is capable of broadcasting messages while avoiding such situation in which same broadcast packets arrive at one and the same processor by way of different routes and a parallel processor system in which the split switch circuits are used.

In view of the above and other objects which will become apparent as description proceeds, there is provide a parallel processor system in which each of plural switch circuits for interconnecting a plurality of processors comprises a plurality of address modifying circuits provided in correspondence to a plurality of input ports, respectively, for correcting or modifying a transfer destination address which designates a transfer destination output port in the switch circuit, the address being contained in a message inputted through a corresponding input port, and a circuit for transferring the message inputted through a given one of the aforementioned plural input ports to an output port designated by a modified transfer destination address outputted from the address modifying circuit provided in association with the aforementioned given input port.

In a preferred mode for carrying out the invention, each of the address modifying circuits may include an arithmetic operation circuit for determining the transfer destination address contained in the message inputted through the input port associated with the aforementioned address modifying circuit and a correcting value for modifying or correcting the address allocated previously to the associated input port.

BRIEF DESCRIPTION OF THE DRAWINGS

FIG. 5 is a chart showing addend values placed in addition circuits and values placed in input port select registers of input port select circuits provided at individual input/output ports of the 9-input/9-output split crossbar switch shown in FIG. 4;

FIG. 12A is a diagram for explaining the operation of a demand address generation circuit in a PE input port of the exchange switch shown in FIG. 11;

FIG. 12B is a diagram for explaining the operation of a demand address generation circuit in an X input port of the exchange switch shown in FIG. 11;

FIG. 12C is a diagram for explaining the operation of a demand address generation circuit in a Y input port of the exchange switch shown in FIG. 11;

FIG. 16 is a diagram showing the relationship between the range of output ports requiring transfer of a broadcast message in the crossbar switch shown in FIG. 14 and mode information.

DESCRIPTION OF THE PREFERRED EMBODIMENTS

Now, the present invention will be described in detail in conjunction with the preferred or exemplary embodiments thereof by reference to the accompanying drawings.

Embodiment 1

(1) Structure of a parallel processor system implemented by using split crossbar switches in a crossbar network.

Figure 3:
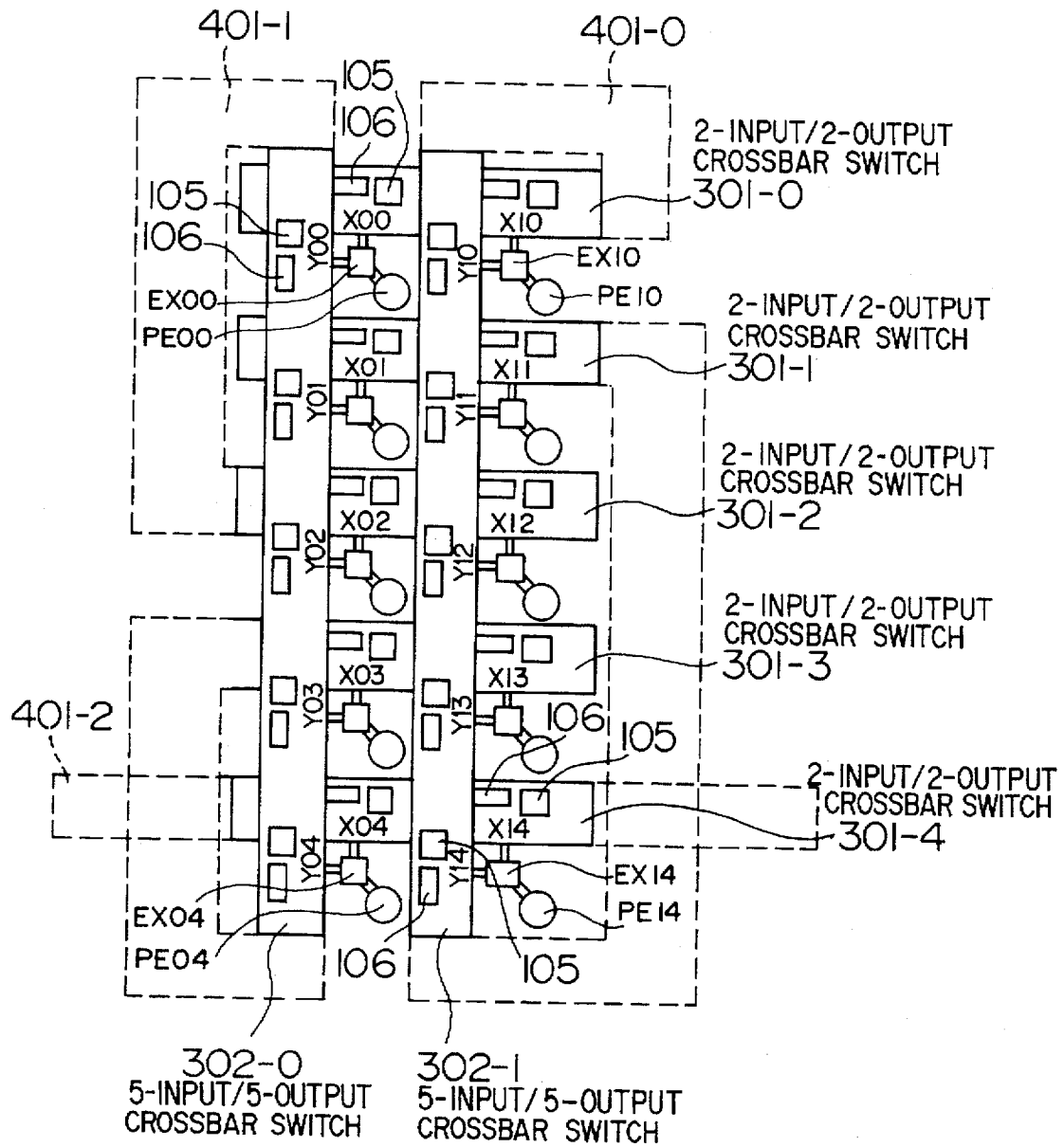
FIG. 3 is a diagram showing a logical structure of a hyper-crossbar network in which processor elements are connected in a 5-row/2-column matrix-like array by using the split crossbar switches having 9 input ports and 9 output ports, respectively.

FIG. 3 is a diagram showing a logical structure of a parallel processor system implemented by using split crossbar switches each obtained by splitting a 9-input/9-output crossbar switch in a crossbar network interconnecting PEs (processor elements) 00 to 14 arrayed in a matrix-like configuration including five rows and two columns. As the crossbar switches arrayed in the columnwise direction or X-direction, there are employed split crossbar switches 301-0 to 301-3 each having two inputs and two outputs. On the other hand, 5-input/5-output crossbar switches 302-0 and 302-1 are employed as the crossbar switches arrayed in the columnwise direction or Y-direction. In the figure, two split crossbar switches shown as interconnected by phantom lines belong to one and the same 9-input/9-output crossbar switch. Each of the crossbar switches 301 and 302 has input/output ports to each of which there are connected an addition circuit 105 and an input port select circuit 106, respectively, according to an aspect of the present invention.

Figure 4:
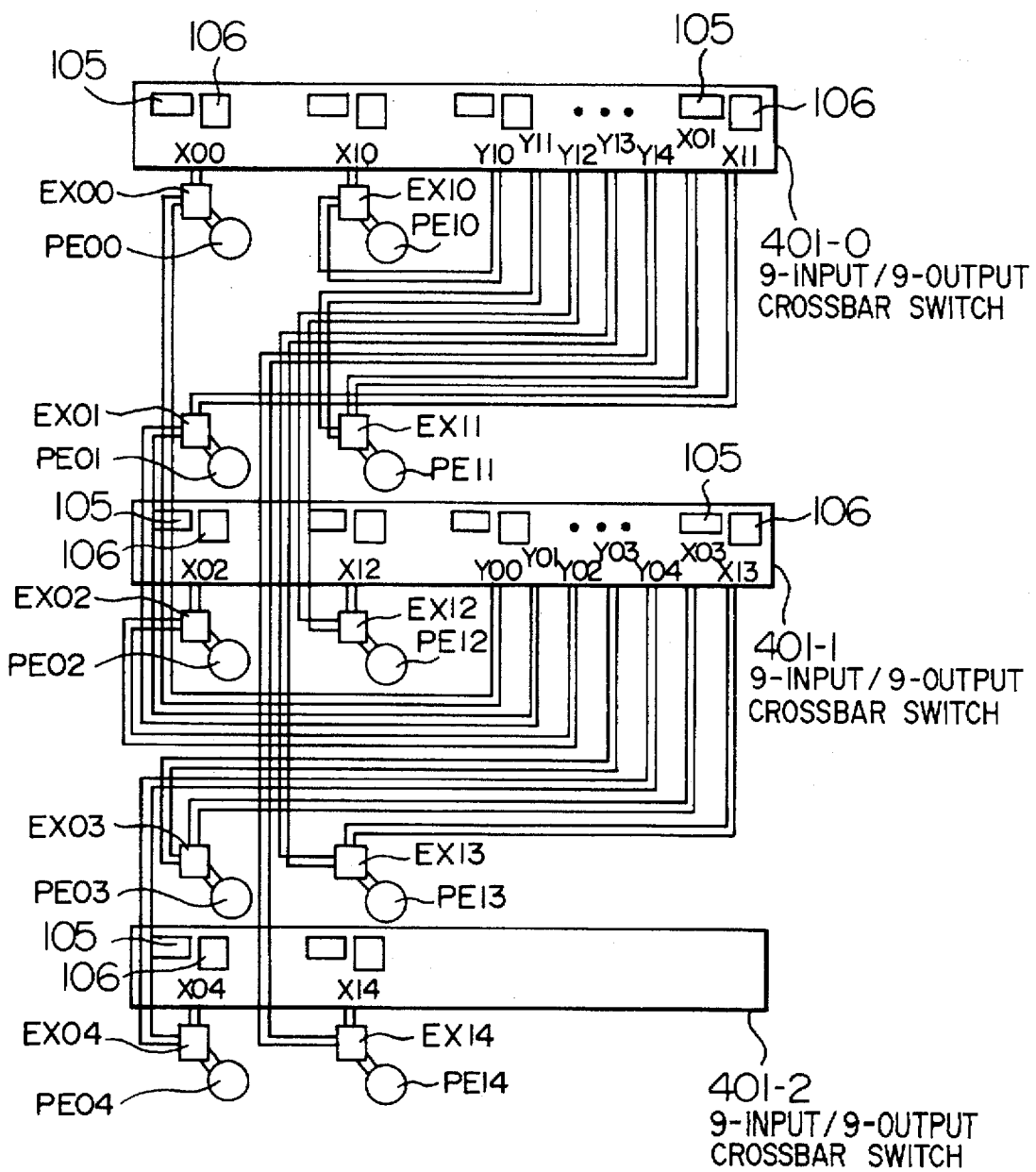
FIG. 4 is a diagram showing a physical structure of a hyper-crossbar network in which processor elements are connected in a 5-row/2-column matrix-like configuration by using the split crossbar switches having 9 input ports and 9 output ports, respectively.

FIG. 4 is a circuit diagram showing physical connections between EXs and PEs and the 9-input/9-output split crossbar switches 401-0 to 401-2 which constitute the crossbar network shown in FIG. 3. Although the crossbar networks is shown in FIG. 3 as being composed of five 2-input/2-output crossbar switches and two 5-input/5-output crossbar switches, it should be understood that in practical applications, the crossbar network is constituted by three 9-input/9-output crossbar switches 401-0 to 401-2.

Figure 6:
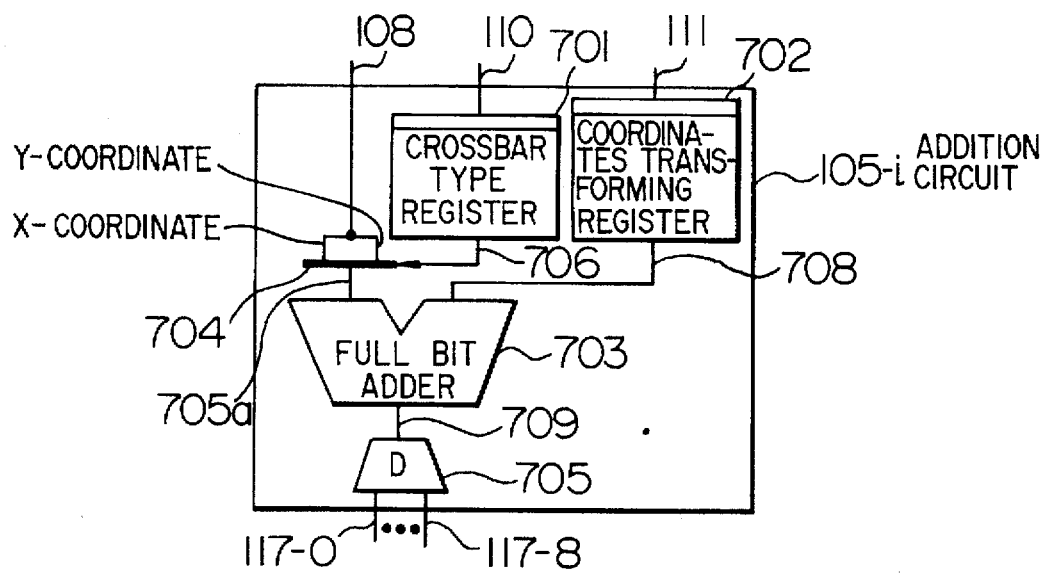
FIG. 6 is a circuit diagram showing a configuration of an addition circuit provided in the switch shown in FIG. 1.

The nine input/output ports of the crossbar switch 401-0 are allocated with physical port (ID) numbers "0" to "8" serially in this order as viewed from the left-hand side in the figure. However, for the convenience of illustration, the physical numbers allocated to these ports are designated by X00 to X10, Y10 to Y14 and X01 to X11, respectively. These physical port numbers indicate that the EX 00 to EX 10, EX 10 to EX 14 and EX 01 to EX 11 are connected to the respective ports. FIG. 6 shows correspondences between the physical input/output port numbers and the logical input/output port numbers of the crossbar switches 401-0 to 401-2. As can be seen from the figure, the crossbar switch 401-0 bears the 2-input/2-output crossbar switches 301-0 and 301-1 and the 5-input/5-output crossbar switch 302-1 shown in FIG. 3.

The input/output ports of the crossbar switch 401-1 are designated by physical port numbers X02 to X12, Y00 to Y04, and X03 to X13, respectively, which indicate that the EXs 02 to 12, the EXs 00 to 04 and the EXs 03 to 13 are connected to the respective input ports. In other words, the crossbar switch 401-1 bears the 2-input/2-output crossbar switches 301-2 and 301-3 and the 5-input/5-output crossbar switch 302-0.

Two of nine input/output ports of the crossbar switch 401-0 are designated by the physical port number X01 to X14, ad the EX 04 to EX 14 are connected to these ports, respectively. The other seven ports which are unused are not shown. Thus, the crossbar switch 401-1 bears the 2-input/2-output crossbar switch 301-4 shown in FIG. 3.

(2) Structure and operation of the split crossbar switch

Figure 1:
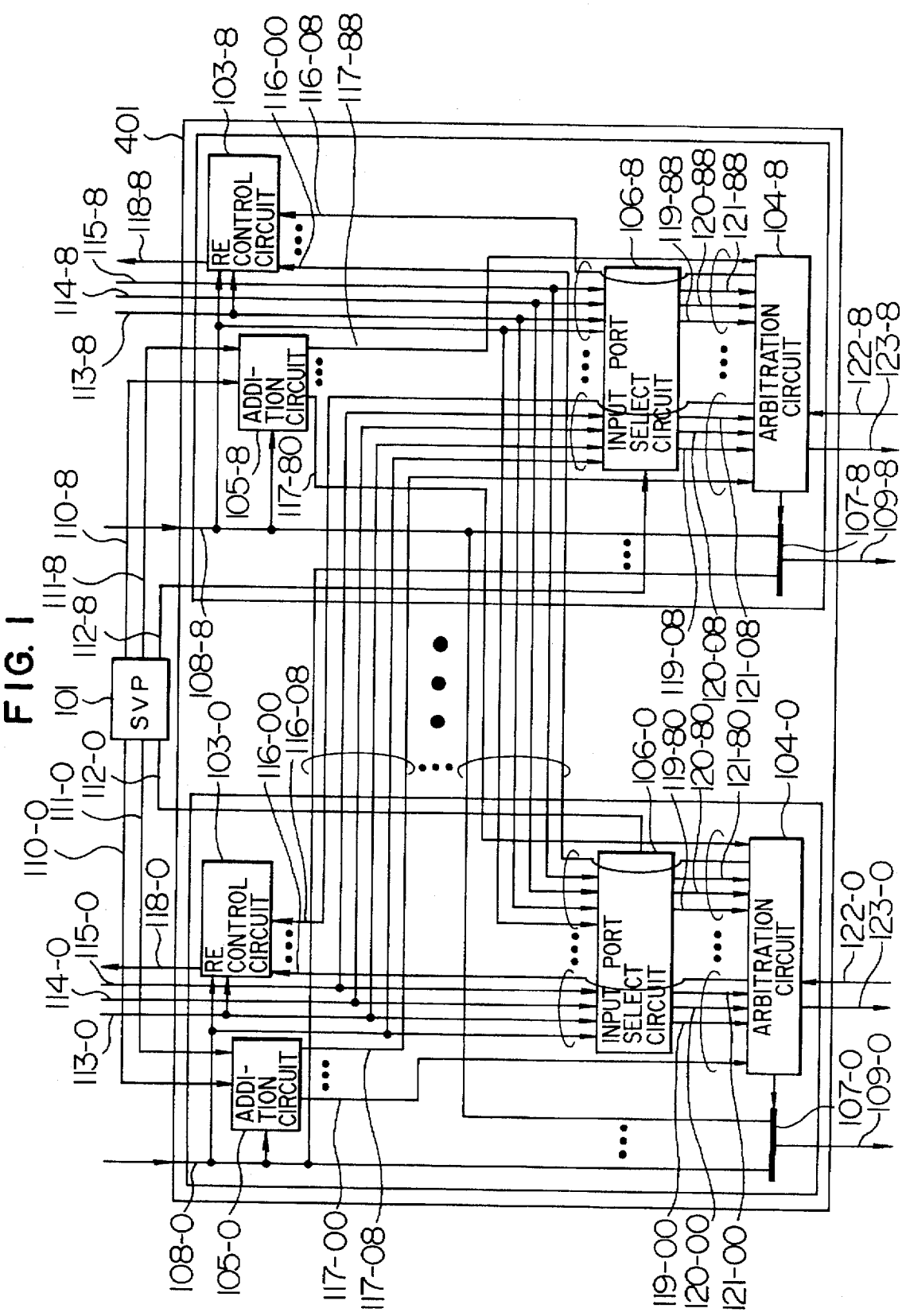
FIG. 1 is a circuit diagram showing a configuration of a split crossbar switch having 9 input ports and 9 output ports.

FIG. 1 shows a structure of the 9-input/9-output port crossbar switch 401 and connection between the crossbar switch 401 and a SVP 101. The crossbar switch 401 includes for each input/output port a RE (Read Enable) control circuit 103 for reading packets from the input port, a selector 107 and an arbitration circuit 104 for controlling the selector 107 to thereby arbitrate or manage a plurality of packet transfer requests issued for a same output port. An aspect featuring the present invention is seen in that the addition circuit 105 and the input port selecting circuit 106 is provided for each of the input/output ports.

In FIG. 1, lines 108 and 109 indicate data lines, a line 113 indicates a packet start or BOM (Begin Of Message) signal line, a line 114 indicates a packet end or EOM (End Of Packet) signal line, a line 115 indicates a packet validating signal or CMD (Command) line, a lie 118 indicates a RE (Read Enable) signal line, a line 122 indicates a FULL signal line and a line 123 indicates a WE (Write Enable) signal line, respectively.

Each of the addition circuit 105-i (where i represents an integer in a range 0 of to 8) is provided in correspondence to each of the input ports and serves for generating a transfer destination coordinate values for determining the output port of the associated crossbar switch 401 on the basis of the coordinate values of the destination PE contained in an input one-to-one transfer packet. The coordinate values of the destination or sink PE contained in the input packet are, so to say, logical coordinate values for determining the logical number of the output port of the split crossbar switch to which the input port associated with the addition circuit belongs. The addition circuit converts or transforms the logical coordinate values to the corresponding coordinate values in the associated crossbar switch 401 for use in determining the transfer destination output port.

FIG. 6 shows a structure of one of the addition circuits 105-i. As can be seen in the figure, the addition circuit 105-i is comprised of a coordinates register 701, an addend register 702, a full-bit adder 703, a selector 704 and a decoder 705. A crossbar type register 701 is adapted to hold crossbar identification or type information of "0" or "1" indicating whether the i-th input/output port corresponding to the full bit adder 703 is to be used as the input/output port of the crossbar switch in the X-direction or to be used as the input/output port of the crossbar switch in the Y-direction, respectively. In dependence on this crossbar identification information, the selector 704 selects the X-coordinates or the Y-coordinates contained in the input packet as the coordinates for determining the transfer destination or sink output port. FIG. 5 shows values stored in the crossbar type register 701 which is provided in each of the input/output ports of the crossbar switches 401-0 to 401-2.

The coordinate transformation register or addend register 702 is placed with a physical port number of the leading one of the serial input/output ports belonging to the split crossbar switch to which the input/output port associated with the above-mentioned register 702 belongs. As the leading input/output port, there can be used one of those ports allocated with the physical port numbers of values ranging from 0 (zero) to a maximum input/output port number minus 1 (one). Parenthetically, the values placed in the coordinate transformation registers 702 of the addition circuits provided in the individual input/output ports of the crossbar switches 401-0 to 401-2 are also shown in FIG. 5.

The port number held in the coordinate transformation register 702 includes a number of valid digits required for representing the physical numbers of all the input/output ports in the associated crossbar switch 402. In the case of the illustrated embodiment, the valid digits are given by four bits. In this manner, the input/output ports of any given number can be used as the leading input/output port mentioned above. In other words, points at which the crossbar switch 402 is split as well as the number of the input/output ports in the split crossbar switch can arbitrarily be selected.

The full bit adder 703 serves for the function to add the port number held in the coordinate transformation register (or addend register) 702 to X-coordinate value or Y-coordinate value contained in the input packet to thereby generate coordinate values for determining the transfer sink after modification. In order to ensure the aforementioned arbitrariness in respect to the splitting of the crossbar switch as well as the arbitrariness in respect to the number of the input/output ports in the split crossbar switch, the full bit adder 703 performs the addition by using the valid digits mentioned above. Incidentally, the X-coordinate and the Y-coordinate in the packet as inputted are each represented by a number of valid digits which are required for identifying discriminatively all the processors from one another. The number of the valid digits to this end may differ from the number of the valid digits representing the output port (ID) numbers. In the case of the instant embodiment now under consideration, the X-coordinate and the Y-coordinate in the packet are given by one bit and three bits, respectively, for identifying the processors provided in the five-row/two-column array.

Figure 7:
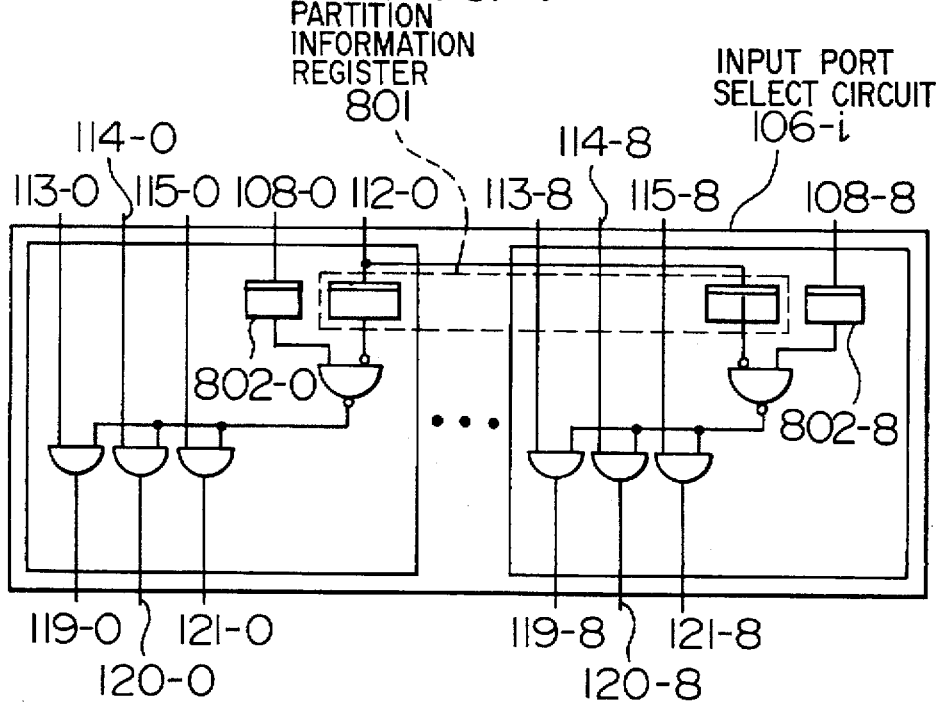
FIG. 7 is a circuit diagram showing a configuration of an input port select circuit provided in the switch shown in FIG. 1.

FIG. 7 is a circuit diagram showing a configuration of the input port select circuit 106-i (where i represents an integer of 0 to 8). Each of the input port select circuits 106-i includes a group of input port selecting registers generally denoted by 801, registers 802 for storing BCBs 203 for every output port, and a plurality of mask gates for controlling signal transfers in dependence on the outputs of the registers 802.

Each of the input port select circuits 106-i is provided in one-to-one correspondence relation to each of the output ports and is so designed as to output to the associated output port the packet transferred from the input port belonging to the same split crossbar switch as that output port, while the packet from the other input port belonging to the split crossbar switch to which the above-mentioned output port does not belong is prevented from being outputted to that output port. In this manner, the packet inputted through a given one of the input ports is prevented from being transferred to the output port belonging to the split crossbar switch which differs from the split crossbar switch to which the above-mentioned given input port belongs. Thus, such problem can positively be avoided that a plurality of packets broadcast simultaneously are transferred to a same processor via different flow paths.

For the purpose of the transfer control described above, the input port select circuits 106-i includes a group of partition information registers generally denoted by 801. The values contained in these registers 801 are given by the bits corresponding to the individual input/output ports in the same crossbar switch 401-i, wherein the values of the bits are previously so set by the SVP 102 (FIG. 1) that the bit assumes a value of "1" when the associated register 801 belongs to the same split crossbar switch to which the corresponding input/output port belongs, while otherwise assuming a value of "0". FIG. 6 shows the values which are in the partition information registers 801 in the input port select circuits 106-i provided at the output ports of the crossbar switches 401-0 to 401-2, respectively.

For the purpose of illustration only, it is assumed that "110000000" is set for the leading input/output port X00 in the crossbar switch 401-0 to which the PE 00 is connected. The partition information stored in these registers 801 are used for making decision as to whether the packet is to be transferred or not through the gates connected to the registers 801.

Next, in conjunction with the structure and operation of the split crossbar switches capable of constituting a plurality of different types crossbar switches, description will be made in what manner a parallel processor network can be realized by using the crossbar switches. Besides, description will also be made concerning the realization of different types crossbar switches having various input/output ports.

By taking as an example the crossbar switch 401-0 shown in FIG. 4, description will first be made of the configuration of the split crossbar switch 102 and operation involved in the transfer of the packets on a one-to-one transfer basis and the transfer of the packets as broadcast.

(1) Transfer of packets on a one-to-one basis

As the one-to-one packet transfer, there can be conceived a packet transfer between a port X00 to which an EX 00 is connected and a port X10 to which the EX 10 is connected, i.e., the packet transfer through the X-crossbar switch, and a packet transfer between a port Y10 to which the EX 10 is connected and a port Y14 to which the EX 14 is connected, i.e., the packet transfer through the Y-crossbar switch, as shown in FIG. 3. Now, let's consider the packet transfer from the EX 00 to the EX 10 by reference to FIG. 1. In the following description, emphasis will be put on the RE control circuit 103-0, an addition circuit 105-0 having the input port number "0", the input port select circuit 106-1 and the arbitration circuit 104-1 of the output port number "1".

Upon arrival of the leading one of the packets at the port X00, both the BOM signal and the CMD signal are issued (i.e., the corresponding signal lines assume "1" level).

In response to issuance of the BOM signal, the RE control circuit reads out the BCB 203 of the packet from the data line 108-0 and confirms that the value of BCB 203 is "0", whereon a logical sum signal of the RE signals 116-00 to 116-08 coming from the output ports is outputted as a RE signal 118-0. This state remains invariable until the ROM signal is issued again.

The coordinate register 701 is previously set to "0" by the SVP 102 while the addend register 702 is set to "0", as shown in FIG. 5. Since the value of the coordinates register 701 is "0", the addition circuit 105-0 reads out the X-coordinate value of "1" from the data line 108-0 by controlling the selector 704 via the line 706. The X-coordinate value and the addend are added together (i.e., "1"+"0"="1") by the full bit adder 703 via the lines 705a and 708, respectively, and a signal 117-1 (assuming a value of "1" in this case) is issued from the decoder 705 via the line 709. In this manner, the ID number of the output port can be changed by adding the preset value to the transfer or flow control information by means of the full bit adder 703, any crossbar switch can be split or partitioned.

The input port select circuit 106-i responds to issuance of the BOM signal by placing the BCB 202 in the register 802-0. This state is held intact until the BOM signal is again issued. Consequently, a pseudo-BOM 119-1 and a pseudo-CMD 121-1 are issued through the logic illustrated in FIG. 7.

Upon issuance of plural pseudo-BOM signals and pseudo-CMD signals, the arbitration circuit 104 selects one pseudo-BOM signal and one pseudo-CMD signal in accordance with a given arbitration method to thereby control the selector 107 via the line 124-1. Additionally the RE signal 116 is also issued. Unless the pseudo-BOM signal and the pseudo-CMD signal are issued from the other sources, the arbitration circuit 104-1 selects the line 108-0 as the output line to the data line 109-1 by controlling the selector 107-1 via the line 124-1, to thereby issue the RE signal 116-01 and the WE signal 123-1 until the FULL signal 122-1 is issued. Now, the packet transfer from the port X00 to the port X10 is started.

Upon arrival of the packet trailing end at the port X00, both the EOM signal and the CMD signal are issued, i.e., these signals assume "1".

The input port select circuit 106-1 responds to issuance of the EOM signal and the CMD signal of "1s", respectively, by issuing the pseudo-EOM signal and the pseudo-CMD signal in accordance with the logic illustrated in FIG. 7.

The arbitration circuit 104-1 then responds to the issuance of the pseudo-EOM signal and the pseudo-CMD signal by suppressing issuance of the RE signal 116-0 and the WE signal 123-1 (i.e., resetting these signals to "0"), whereupon the packet transfer from the port X00 to the port X10 comes to an end.

(2) Transfer of broadcast packets

In conjunction with the packet transfer through the crossbar switch 401-0, there are available two transfers, i.e., a transfer from the port X00 to which the EX 00 is connected to the ports X00 to X10 and a transfer from the port Y10 to which the EX 10 is connected to the ports Y10 to Y14. The following description will be directed to the transfer from the EX 00 to the EXs 00 to 10 with reference to FIG. 1, by paying attention primarily on the RE control circuit 103-0 and the addition circuit of the input port number "0" as well as the input port select circuits 106-0 and 106-1 and the arbitration circuits 104-0 and 104-1.

Upon arrival of the leading one of packets at the port X00, both the BOM signal and the CMD signal are issued (i.e., corresponding signal lines assume level "1").

The RE control circuit 103-0 responds to issuance of the BOM signal to thereby read out the BCB 203 of the packet from the data line 108-0 and confirms that the value of BCB 203 is "1", whereon a logical sum of the RE signals 116-00 to 116-08 coming from the output ports is outputted as the RE signal 118-0. This state remains as it is until the BOM signal is again issued.

Although operation of the addition circuit 105-0 is enabled, the signal value on the line 117 is neglected by all the arbitration circuits. Accordingly, any further description in this respect will be unnecessary.

In response to issuance of the BOM signal, the input port select circuits 106-0 and 160-1 store the BCB 203 in the register 802-0. This state is maintained as it is until the BOM signal is issued again. In each of the partition information registers 801, there is previously set "110000000" by the SVP 102, as shown in FIG. 5. Consequently, there are issued the pseudo-BOM signals 119-0 and 119-1 as well as the pseudo-CMD signals 121-0 and 121-1 through the logic illustrated in FIG. 7. Owing to the provision of the partition information registers 801 and the logic mentioned above, only the broadcast transfer requests from the input ports X00 to X10 or only the BOM signals 103-0 and 1031 can be accepted.

The arbitration circuits 104-0 and 104-1 operate independent of each other. So far as neither the pseudo-BOM signal nor the pseudo-CMD signal is issued from any other sources, the arbitration circuit selects the line 108-0 as the output line to the data lines 109-0 and 109-1 by controlling the selectors 107-0 and 107-1 via the line 124-1 to thereby issue the RE signals 116-00 and 116-01 and the WE signals 123-0 and 123-1 until the FULL signals 122-0 and 122-1 are issued. Now, the packet transfer from the port X00 to the ports X00 to X00 is started.

Upon arrival of the trailing packet at the port X00, the EOM signal and the CMD signal each of logic "1" are issued.

In response to the issuance of the EOM signal and the CMD signal each of "1", the input port select circuits 106-0 and 106-1 issue the pseudo-EOM signals 120-0 and 120-1 and the pseudo-CMD signals 121-0 and 121-1 through the logic illustrated in FIG. 7.

Upon issuance of the pseudo-EOM signals 120-0 and 120-1 and the pseudo-CMD signals 121-0 and 120-1, the arbitration circuits 104-0 and 104-1 suppress the issuance of the RE signals 116-00 and 116-01 and the WE signals 123-0 and 123-1 (i.e., reset these signals to "0"), whereupon packet transfer from the port X00 to the ports X00–X10 comes to an end.

As can be seen from the foregoing description, the one-to-one packet transfer and the broadcast packet transfer can be carried out in a similar manner as in the case of the hitherto known crossbar switch. In the following, operation of the parallel processor system on the whole will be elucidated by referring to FIG. 3.

(1) One-to-one packet transfer

Figure 2A:
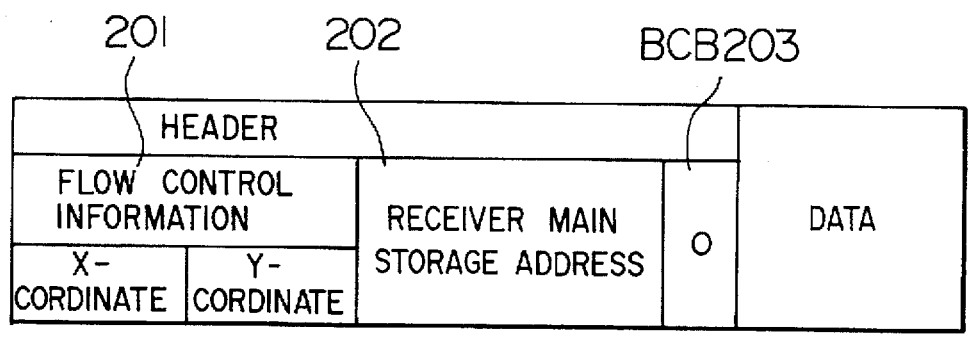
FIG. 2A is a view showing a format of a one-to-one transfer oriented packet used in the switch system shown in FIG. 1.

This transfer operation will be described by taking as an example the transfer from the PE 00 to the PE 14. The one-to-one transfer oriented packet is same as in the case of the hitherto known packet, as shown in FIG. 2A, wherein the BCB 201 is "0", the X-coordinate value contained in the flow control information 201 is "1" with the Y-coordinate value being "4".

The PE 00 then executes the one-to-one packet transfer to the EX 00.

Since the X-coordinate value of this packet is "1", the EX 00 transfers this packet to the X-crossbar switch 301-0 through the input port X00.

Because the crossbar switch 301-0 is the X-crossbar switch, the packet is outputted to the output port X10 in accordance with the X-coordinate value of "1". At his time point, the X-coordinate value of the packet is changed to "0".

The EX 10 connected to the output port X10 of the crossbar switch 301-0 checks the X-coordinate value of the packet. Since the X-coordinate value is "0", the EX 10 checks the Y-coordinate value ("4") and transfers the packet to the Y-crossbar switch 302-1 via the input port Y10. Since the crossbar switch 302-1 is the Y-crossbar switch, the packet is outputted to the output port Y14 in accordance with the Y-coordinate value of "4", whereon the Y-coordinate value of the packet is changed to "0".

The EX 14 connected to the output port Y14 of the crossbar switch 302-1 checks the X- and Y-coordinate values of the packet. Because both the coordinate values are "0", the packet is transferred to the PE 14.

(2) Transfer of broadcast packets

Figure 2B:
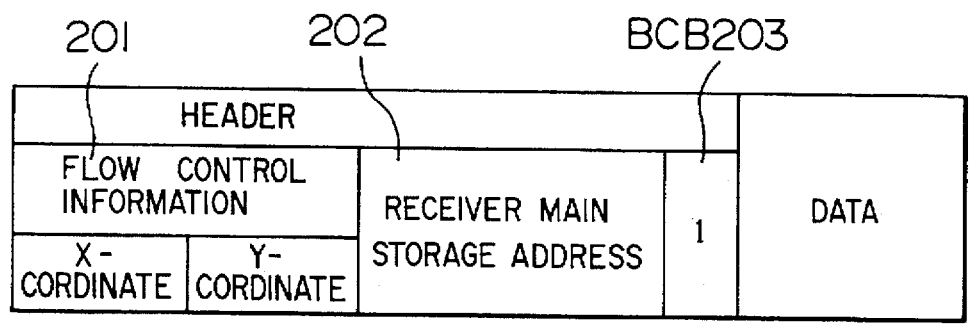
FIG. 2B is a view showing a format of a broadcast oriented packet used in the switch shown in FIG. 1.

By way of example, the broadcast packet transfer from the PE 00 to all the PEs 501 is considered. In the case of the broadcast packets, the BCB 203 has a value of "1", as shown in FIG. 2B. The flow control information 201 may assume any X- and Y-coordinate values, since they are not used.

The PE 00 transfers the broadcast packets to the EX 00.

When the BCB 203 of the packet is "1", the EX 00 transfers the packets to the X-crossbar switch 301-0 via the input port X00 because the BCB 203 has a value of "1" and because these packets oriented in the PE 501.

The crossbar switch 301-0 outputs the packets to all the output ports X00 to X10 since the BCB is "1".

The EX 00 to EX 10 connected to the output ports X00 to X10, respectively, of the crossbar switch 301-0 transfer the packets to the input ports Y00 to Y10 of the Y-crossbar switches 302-0 to 302-1, respectively, since the BCB 203 has a value "1" and the packets originate in the X-crossbar switch.

The crossbar switches 302-0 and 302-1 direct the packets to all the output ports (Y00 to Y04) and (Y10 to Y14).

The EXs 00 to 04 and the EXs 10 to 14 connected to all the output ports (Y00 to Y04) and (Y10 to Y14) of the crossbar switches 302-0 and 302-1 transfer the packets to the PEs 00 to 04 and the PEs 10 to 14 because the BCB 203 is "1" and because the packets are from the Y-crossbar switch, whereupon the broadcast packet transfer comes to an end.

In the foregoing description, the crossbar network is assumed to be realized by using the crossbar switch. It should however be noted that the invention can equally be applied to the multi-stage network by constituting the individual switches of the multistage network by the crossbar switches.

According to the teachings of the invention incarnated in the embodiment described above, it is possible to realize a plurality of logically split or partitioned switch circuits having different numbers of input/output ports, starting from the switch circuits having the physically same structure.

Further, it should be mentioned that even though the network is constituted by a plurality of split switch circuits generated by partitioning logically the switch circuits having the physically same structure, such situation can be prevented in which the same broadcast packets are transferred to one and the same processor through plural routes.

With the embodiment of the invention, it is contemplated to split or partition a crossbar switch having n inputs and n outputs by K (K=$\log_2$ n) to thereby realize two split crossbar switches each having n/2 inputs and n/2 outputs or four split crossbar switches each having n/4 inputs and n/4 outputs.

The packet broadcasting for transferring the packets from one input port to all the output ports in the crossbar switch is also performed in the network constituted by the split crossbar switches. To this end, upon broadcasting, the broadcast packets are transferred to all the output ports of plural logically split crossbar switches which belong physically to one and the same crossbar switch.

In the case of the embodiment, the split crossbar switches must have mutually same numbers of the input and output ports. However, the structure can be simplified.

Embodiment 2

A second embodiment of the present invention will be described below with reference to the accompanying drawings.

This embodiment provides a parallel computer using a crossbar switch of special construction preferable for a variety of numbers of processors. More specifically, the crossbar switch according to the present embodiment is constructed in a manner logically splittable into a plurality of crossbar switch units. For example, it may be split into a plurality of crossbar switch units having different numbers of input-output ports. These crossbar switch units are usable for either x or Y direction.

Figure 8:
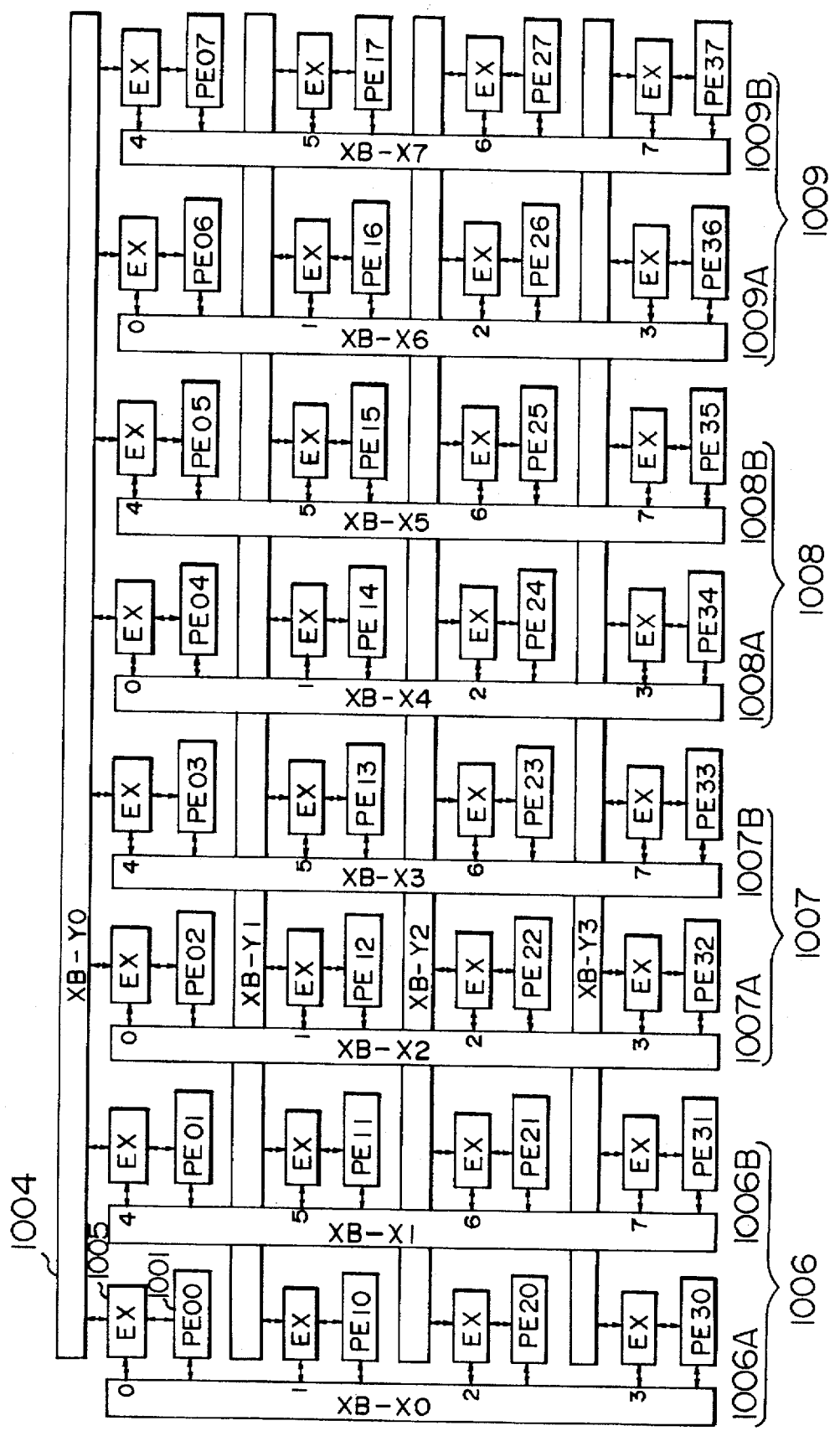
FIG. 8 shows another embodiment of the parallel computer used according to the present invention.

FIG. 8 is a diagram showing an example of configuration of a parallel computer according to the present invention. In this parallel computer, the element processors PE making up component parts thereof are connected by a network defined as follows: Each element processor PE is arranged on a two-dimensional grid, and the element processor PE groups on each column or row are connected by a mutual connecting network (crossbar switch). This network will hereinafter be referred to as a two-dimensional hypercrossbar network.

FIG. 8 shows an example of parallel computer using a two-dimensional hypercrossbar network including 32 (4×8) element processors PE.

In FIG. 8, numeral 1001 designates an element processor (PE), numeral 1004 an 8-input 8-output crossbar switch (XB-Y) on the row, and numeral 1005 a 3-input 3-output exchange switch (EX). Numerals 1006A, 1006B, 1007A, 1007B, 1008A, 1008B, 1009A, 1009B designate 4-input 4-output crossbar switch units (XB-X) on the column respectively. According to the present embodiment, crossbar switch pairs 1006A-1006B, 1007A-1007B, 1008A-1008B and 1009A-1009B on the column are crossbar switch units (hereinafter referred to as the split crossbar switches) obtained by logically splitting each of the 8-input 8-output crossbar switches 1006, 1007, 1008 and 1009 respectively. As a result, the crossbar switches on both row and column can be configured of the same type of split 8-input 8-output crossbar switches. According to the prior art, the construction of a crossbar network as shown in FIG. 8 requires an 8-input 8-output crossbar switch and a 4-input 4-output crossbar switch. According to the present embodiment, by contrast, the same network can be constructed of the same type of 8-input 8-output crossbar switches, thereby reducing the design and production costs of the network.

The numerical character in each element processor PE designates an element processor number (PE number) expressed by two-digit octal number. As a result of the indication on octal notation, the digit in the order of 10 corresponds to the port number of XB-X, and the one in the order of unity to the port number of XB-Y. The exchange switch EX connected with this element processor also has the same exchange switch number (EX number) as the element processor PE. This exchange switch EX is adapted to connect an element processor PE to a crossbar switch XB-X on the column, the particular element processor PE to a crossbar switch XB-Y on the row, and the crossbar switches XB-Y on these columns to the crossbar switch XB-Y on the row. As a result, the use of an exchange switch EX permits data transfer between given element processors PE. The data translation between element processors PE is effected by a message system. Specifically, a message is constructed in and sent out to the network from a data-transmitting element processor (transmitting PE), and received by a data-receiving element processor (receiving PE) thereby to effect data transfer.

Figure 9:
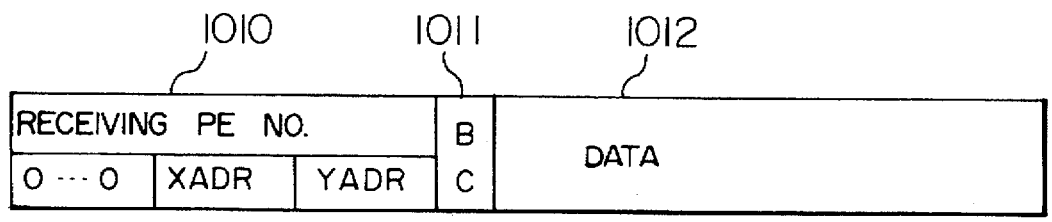
FIG. 9 shows the configuration of a message used in the parallel computer shown in FIG. 8.

An example of message construction is shown in FIG. 9. In FIG. 9, numeral 1010 designates a receiving element processor number (receiving PE number) field, numeral 1011 a broadcast control bit BC, and numeral 1012 a data field providing transfer information. The least significant three bits YADR of the receiving element processor number (receiving PE number) field 1010 represents information for switching the row crossbar switch XB-Y, and the next significant two bits XADR of the receiving element processor number (receiving PE number) field 1010 is information for switching the column crossbar switch XB-X. All the most significant digits of the receiving element processor number (receiving PE number) field 1010 are zero and are used for enlargement by increasing the number of element processors (PEs) in a parallel computer.

Figure 10:
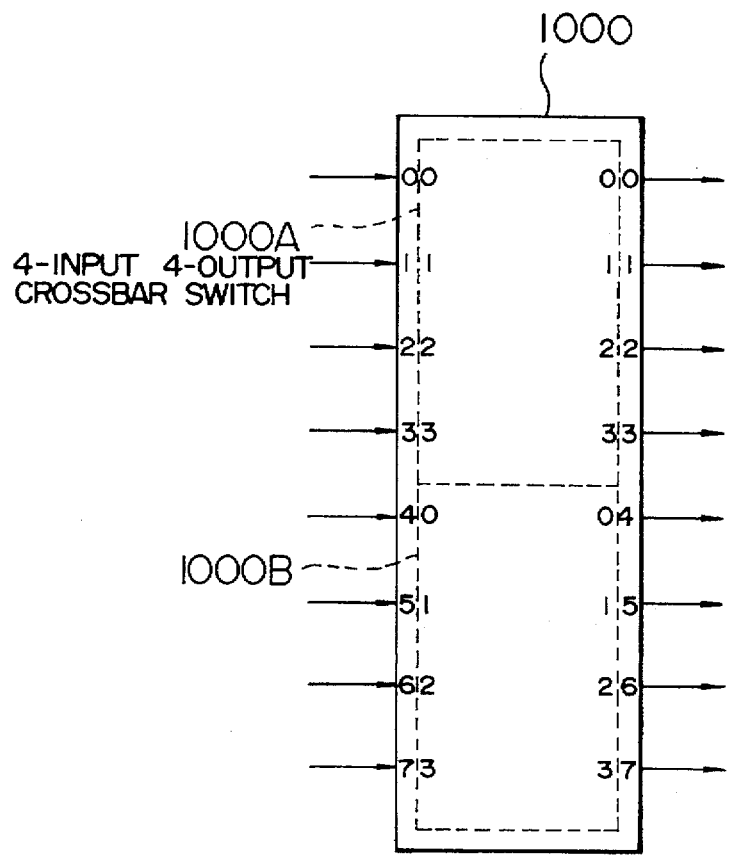
FIG. 10 shows the relationship between a split crossbar switch used in the parallel computer shown in FIG. 8 and a physical crossbar switch.

FIG. 10 shows two 4-input 4-output split crossbar switches 1000A, 1000B obtained by logically splitting an 8-input 8-output crossbar switch 1000 used in the present embodiment.

The physical input port numbers and the physical output port numbers of the 8-input 8-output crossbar switch 100, as shown to the extreme left and right in the diagram, are assumed to be 0 to 7. Among these crossbar switches, the input ports of physical input port numbers 0 to 3 and the output ports of physical output port numbers 0 to 3 are used as input and output ports respectively of the split crossbar switch 1000A. These input and output ports of the split crossbar switch 1000A, as shown in the diagram, are allotted with the logical input port numbers 0 to 3 and the logical output port numbers 0 to 3 respectively.

In similar fashion, the input ports of the physical input port numbers 4 to 7 and the output ports of the physical output numbers 4 to 7 are used as input ports and output ports of the split crossbar switch 1000B respectively. These input and output ports of the split crossbar switch 1000B are also allotted with the logical input port numbers 0 to 3 and the logical output port numbers 0 to 3, respectively.

Figure 11:
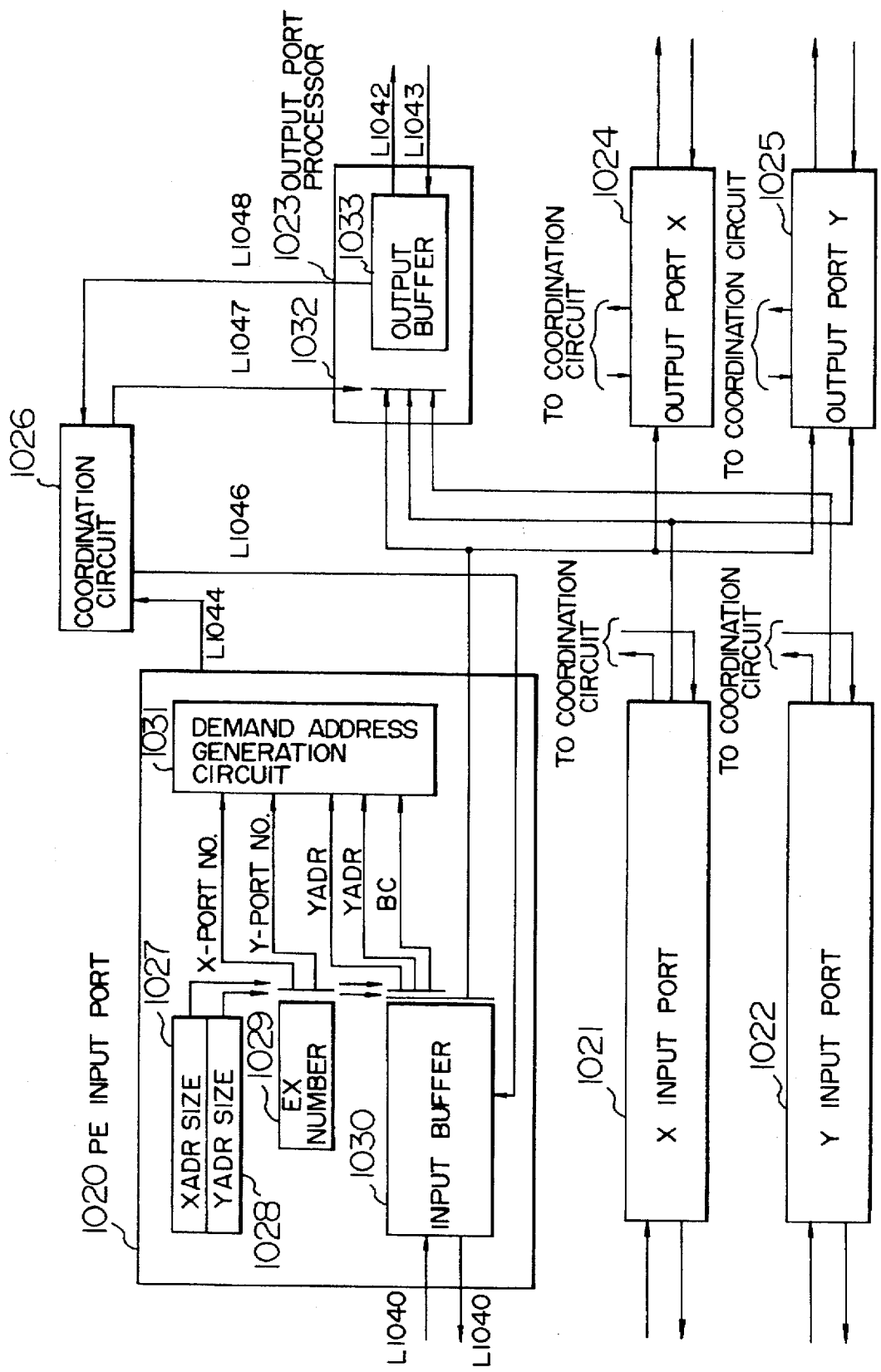
FIG. 11 is a diagram showing a detailed configuration of an exchange switch used in the parallel computer shown in FIG. 8.

FIG. 11 schematically shows a construction of the exchange switch EX. In FIG. 11, numerals 1020 to 1022 designate input ports of messages from the element processors PE connected to exchange switches respectively, the column crossbar switch XB-X and the row crossbar switch XB-Y, numerals 1023 to 1025 output ports of messages to the element processors PE, the related column crossbar switch XB-X and the related row crossbar switch XB-Y, numeral 1026 a coordination circuit, numeral 1027 a region for holding the size (number of bits) of the XADR field, numeral 1028 a region for holding the size (number of bits) of the YADR field, numeral 1029 a region for holding the exchange switch number, numeral 1030 an input buffer, numeral 1031 a demand address generation circuit, numeral 1032 a selector, and numeral 1033 an output buffer.

The input ports 1020 to 1022 are configured the same way for other than the demand address generation circuit 1031. The output ports 1023 to 1025 are also configured in the identical manner for other than the number of input ports connected to the selector 1032.

Now, the configuration of the input ports will be described with reference to the PE input port 1020. An import port holds the following network information in advance:

(1) Size (number of bits held) 1027 of the XADR field: Used at the time of cutting out the XADR portion from the EX number 1029 and the message (2) Size (number of bits held) 1028 of the YADR field: Used at the time of cutting out the YADR portion of the EX number 1029 and the message (3) Exchange switch number 1029: Providing the same number as the element processor PE connected thereto and used for comparing the address in the message These information are set in advance by an external circuit (such as a host computer (not shown) or a service processor (not shown)). As an alternative, they may be set by exchanging signals representing the condition information between the switches connected thereto.

By use of the XADR field size 1027 and the YADR field size 1028, the port number (X-port number) of the column crossbar switch XB-X connected to the exchange switch EX and the port number (Y-port number) of the row crossbar switch XB-Y are cut out from the exchange switch number 1029, and is sent into the demand address generation circuit 1031, thereby providing information for determining an address at the time of demand address generation.

The message sent into the PE input port 1020 through the line L1040 from the element processor PE connected to the exchange switch, on the other hand, is stored in the input buffer 1030. In the process, if the input buffer 1030 has no margin of space, an input buffer busy signal is sent to the particular element processor PE through the line L1041, thereby suppressing subsequent message transfer demands from the element processor PE.

The information on transfer destination is cut out from the message stored in the input buffer 1030.

The information on the transfer destination includes:

(1) XADR: A partial address for switching XB-X of the transfer destination element processor number (transfer destination PE number)

(2) YADR: A partial address for switching XB-Y of the transfer destination element processor number (transfer destination PE number)

(3) BC: A broadcast control bit

These information are sent to the demand address generation circuit 1031 for determining the address at the time of generating a demand address. For cutting out XADR and YADR, by the way, as in the case of exchange switch EX number 1029, the XADR- field size 1027 and the YADR field size 1028 are used.

The demand address generation circuit 1031 is for generating a massage translation destination address (i.e., ID of the output port) demanded from the input port 1020 and sending the address to the coordination circuit 1026 through the line L1044.

A reply (accepting or rejecting the transmission) to the transmission demand from each input port is sent through the line L1046 from the coordination circuit 1026. Also, the selector 1032 in a corresponding output port is switched through the line L1047 at the same time.

The message of the selected input port is introduced to the output buffer 1033 of the demand address (output port ID) through the line L1045, and further through the line 1042, sent to the element processor PE connected therewith. The message is sent from another output port to XB-X or XB-Y.

In the case where the input buffer (not shown) of the row crossbar switch XB-Y, the column crossbar switch XB-X or the element processor PE connected to the exchange switch has no margin of space, then an input buffer busy signal is sent in through the line L1043. In accordance with this signal, the transmission processing is suppressed. In the case where the margin is depleted of the output buffer 1033 as a result of this effect, the fact is notified through the line L1047 to the coordination circuit 1026.

The relationship between the output information and the input information of the demand address generation circuit 1031 of the Y input port 1022, the x input port 1021 and the PE input port 1020 is shown in FIGS. 12A, 12B and 12C respectively. In the case under consideration, a configuration attaching priority to the column crossbar switch XB-X is assumed. More specifically, when XADR or YADR fails to coincide with the x port number or Y port number respectively in the PE port, i.e., when the transmission PE and the receiving PE fail to share the column crossbar switch XB-X or the row crossbar switch XB-Y, the message is sent out to the column crossbar switch XB-X. Also, in the broadcast processing, the data is sent from the transmission PE sequentially to the column crossbar switch XB-X, the row crossbar switch XB-Y and every PE in that order. Although priority is placed on the column crossbar switch XB-X in the case under consideration, the logics may be constructed alternatively with priority attached to the row crossbar switch XB-Y.

Figure 13:
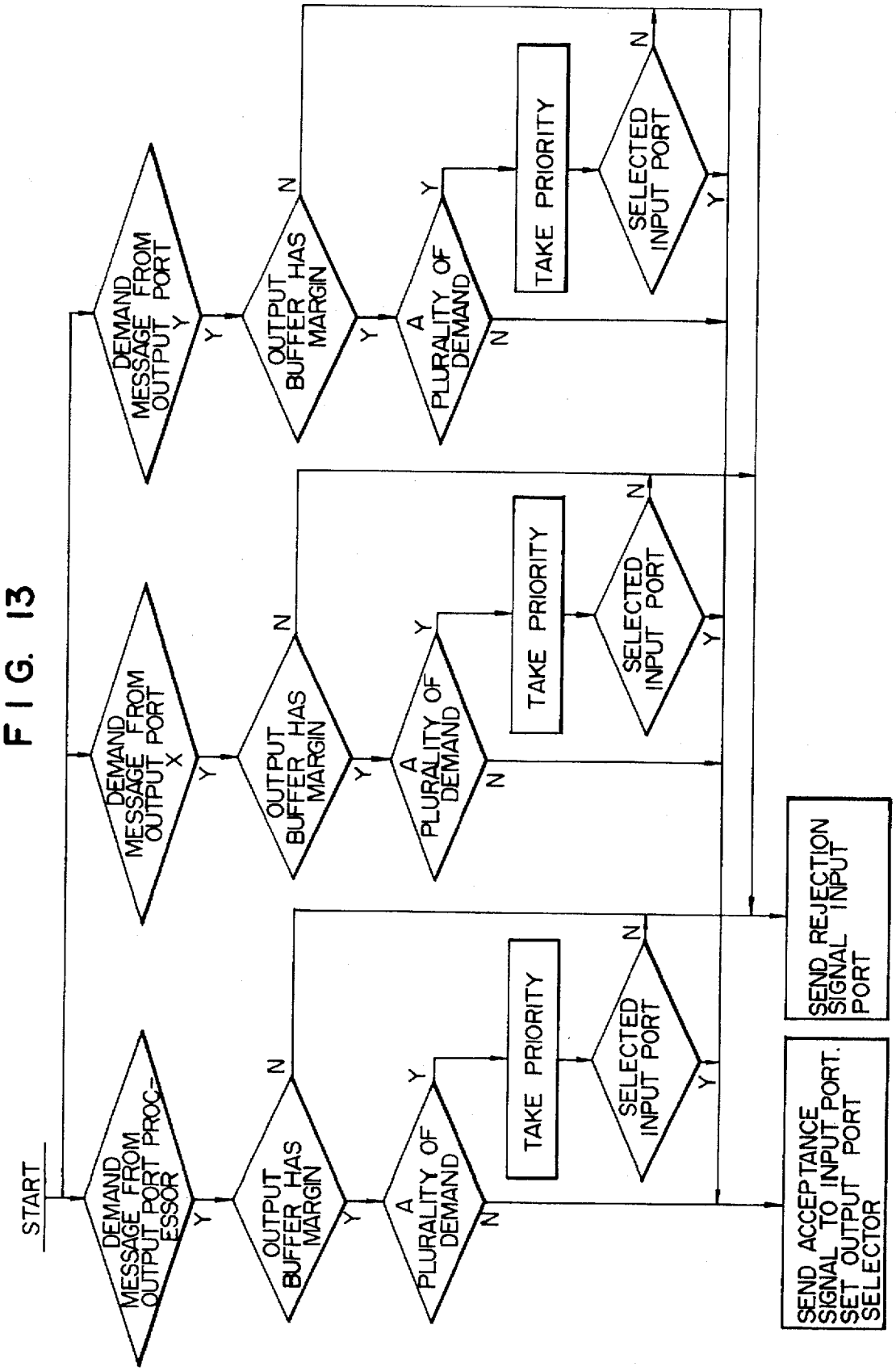
FIG. 13 is a flowchart of the operation of a coordination circuit in the exchange switch shown in FIG. 11.

The processing steps of the coordination circuit 1026 is shown in FIG. 13. In the case where a transfer demand is issued to each output port from a plurality of input ports at the same time, priority is placed in a manner to select one of the input ports. This priority is placed on the x input port, Y input port and the PE input port in that order in order not to increase the number of messages in the network on the one hand and to give priority to a message having many transfer steps on the other hand.

Figure 14:
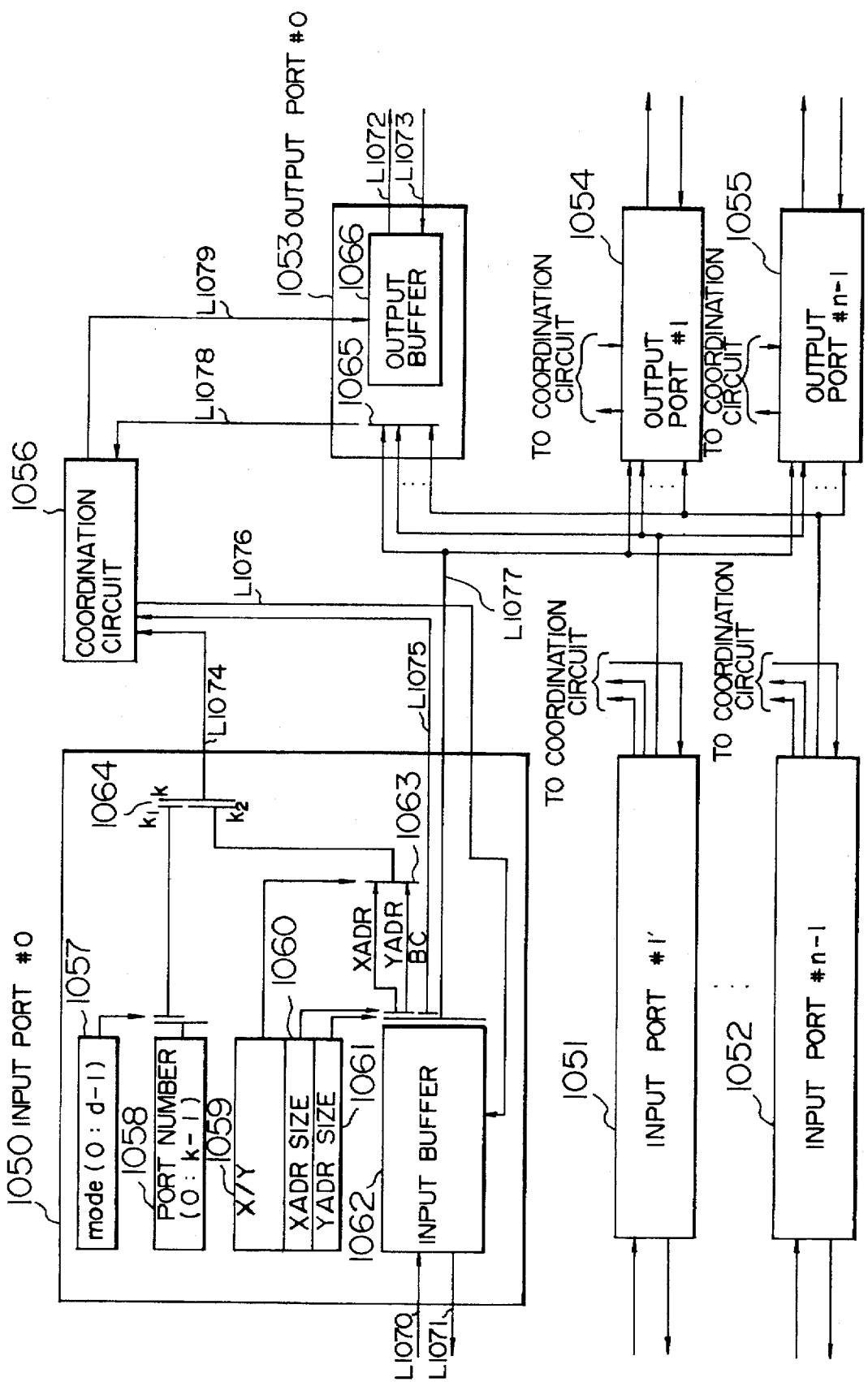
FIG. 14 is a detailed diagram showing a crossbar switch used in the parallel computer shown in FIG. 8.

Next, the configuration of a physical crossbar switch according to the present embodiment used for both the column crossbar switch XB-X and the row crossbar switch XB-Y is schematically shown in FIG. 14.

It is sufficient for the parallel computer shown in FIG. 8 to have an 8-input 8-output physical crossbar switch as described above. In the description that follows, however, a physical crossbar switch has a number n of inputs and also n outputs for the purpose of generalization. The character n is a positive integral number expressed as the k-th power of 2. In other words, k is a positive integral number given as $\log_2 n$.

In FIG. 14, numerals 1050 to 1052 designate input ports of a message from a plurality of exchange switches EX to be connected to the particular physical crossbar switch, numerals 1053 to 1055 output ports of a message to the exchange switches EX, numeral 1056 a coordination circuit, numeral 1057 a region for holding mode information (d bits) to determine the configuration of the particular physical crossbar switch, numeral 1058 a region for holding the input port number, numeral 10589 and x/Y type information, numeral 1060 a region for holding the XADR field size (number of bits), numeral 1061 a region for holding the YADR field size (number of bits), numeral 1062 an input buffer, numerals 10643 to 1065 selectors, and numeral 1066 an output buffer.

The input ports 1050 to 1052 are configured the same way as the output ports 1053 to 1055 are.

Now, explanation will be made about the configuration of the input ports with reference to the input port 1050 of the physical port number 0.

Each input port holds the following network information in advance:

(1) Mode information (d bits) 1057: Information on split use of crossbar switch (2) Input port number 1058: Number information of input port (3) x/Y type 1050: Information for identifying whether the split crossbar switch associated with the input port is the column crossbar switch XB-X or the row crossbar switch XB-Y.

(4) XADR field size (number of bits) 1060: Used at the time of cutting out the YADR portion from the EX number 1029 and the message (5) YADR field size (number of bits) 1061: Used at the time of cutting out the YADR portion from the EX number 1029 and the message These information are set in advance from an external unit (such as a host computer (not shown) or a service processor (not shown)) or by exchanging signals representing each switch condition between switches connected thereto.

First, explanation will be made about a method of preparing mask information for converting a logical crossbar switch address in a message from the input port number 1058 and the mode information 1057 to an actual crossbar switch address.

In the mode information 1057, four types of modes of, say, 00, 01, 10, 11 are assumed to be set. They indicate that the crossbar switch is split into one, two, four and eight units respectively. In this case, the mode information 1057 becomes two bits (d=2). When the crossbar switch has a number n of inputs and also n outputs, the most significant $k_1$ bits of k bits ($k=\log_2 n$) in the input port number 1058 of a required address are masked. The number $k_1$ of bits to be masked varies as follows in accordance with the mode information 1057:

(1) When mode information is 00 (i.e., split into one), $k_1=0$ bit (2) When mode information is 01 (i.e., split into two), $k_1=1$ bit (3) When mode information is 10 (i.e., split into four), $k_1=2$ bits (4) When mode information is 11 (i.e., split into eight), $k_1=3$ bits The message sent into the input port 1050 through the line L1070 from a corresponding exchange switch EX, on the other hand, is stored in the input buffer 1062. In the process, if the input buffer 1062 has no margin of space, an input buffer busy signal is sent to the exchange switch EX of an input source through the line 1071, thereby suppressing subsequent demands for message transfer from EX.

The transfer destination information is cut out from the message thus stored in the input buffer 1062. This transfer destination information includes:

(1) XADR: A partial address for switching XB-X of the element processor number of a transfer destination (transfer destination PE number)

(2) YADR: A partial address for switching XB-Y of the element processor number of a transfer destination (transfer destination PE number)

(3) BC: Broadcase control bit

In order to cut out the XADR and YADR, the XADR field size 1060 and the YADR field size 1061 are used. Further, with the X/Y type information 1059 as address information required for the crossbar switch under consideration, either XADR or YADR is selected by the selector 1063.

Furthermore, the most significant bit $k_1$ of the address information is masked at 1064 with the mask information mentioned above, and is sent to the coordination circuit 1056 through the line L1074 as an actual output port address.

The broadcase control bit is sent directly to the coordination circuit 1056 through the line L1057.

A reply (permitting or rejecting the transmission) to a transmission demand from each input port is issued through the line L1076. At the same time, the selector 1065 in a corresponding output port is switched through the line L1078.

The message of a selected input port is introduced into the output buffer 1066 of the demanded output port number through the line L1077, and is sent through the line L1072 to the exchange switch EX connected thereto.

In the case where there is no margin of space in the input buffer (not shown) of the exchange switch EX connected thereto, an input buffer busy signal is received through the line L1073. In accordance with this signal, the transmission processing is suppressed. If the result is a lack of margin of space in the output buffer circuit 1066, the fact is notified through the line L1078 to the coordination circuit 1056.

Figure 15:
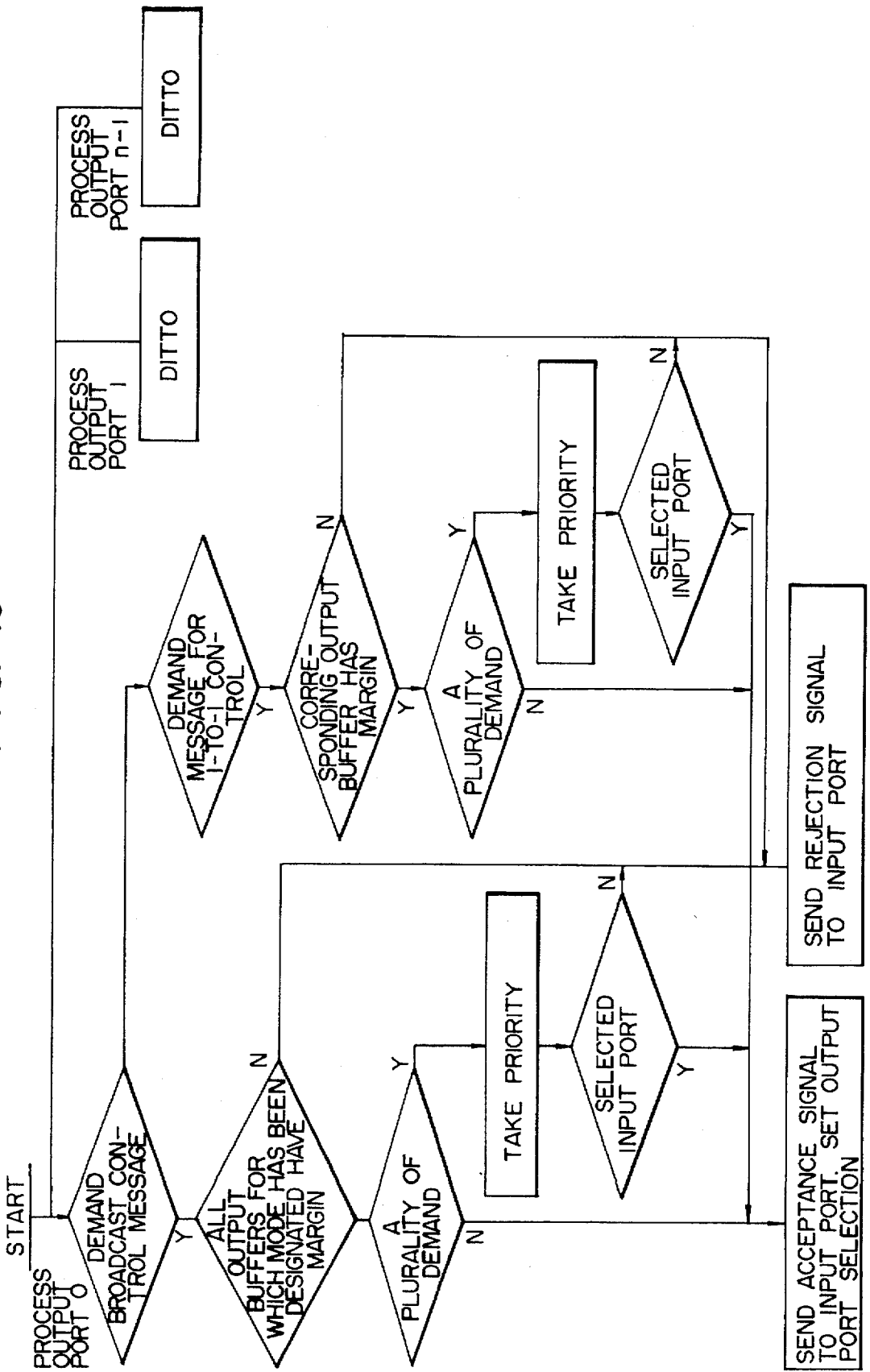
FIG. 15 is a flowchart of the operation of the coordination circuit in the crossbar switch shown in FIG. 14.

The order of processing in the coordination circuit 1056 is shown in FIG. 15. The operation of the coordination circuit 1056 is basically the same as that of the coordination circuit 1026 (FIG. 13) of the exchange switch EX, except that two pieces of information are added to the former: the broadcast control information BC sent from each input port and the crossbar switch mode information identical to that for each input port held inside. These two information makes broadcast processing possible even when a crossbar switch is split. In the broadcast processing, it is necessary to check that the output buffers in all the output ports requiring broadcast have a margin of space. Whether an output port requires broadcast can be determined in the same procedure as the mask processing for an input port described above by use of the mode information. The relationship between the range of outputs requiring translation of a broadcast message and the mode information is shown in FIG. 16.

As a result of the control of a crossbar switch as explained above, one of the following switches can be configured by the mode information from an n-input n-output crossbar switch:

(1) One n-input n-output crossbar switch in the case of mode information 00

(2) Two n/2-input n/2-output split crossbar switches in the case of mode information 01

(3) Four n/4-input n/4-output split crossbar switches in the case of mode information 10

(4) Eight n/8-input n/8-output split crossbar switches in the case of mode information 11

In applications of the techniques according to the present embodiment, the number of the element processors on the column or row is not limited. Further, the techniques of the present embodiment are applicable also to the m-dimensional hypercrossbar network with an m-dimensional (m: an integer of at least 3) grid structure.

According to the embodiment 2, plural split switch circuits obtained from a single switch circuit cannot have different numbers of input/output ports from each other, but the switch circuit need not an adder used in the embodiment 1, and therefore, is simpler than that of the embodiment 1.

We claim:

1. A parallel processor system, comprising:

a plurality of processors; and a plurality of switch circuits each having a plurality of input ports and a plurality of output ports for transferring in parallel a plurality of messages sent from said plurality of processors;

wherein each of said switch circuits includes:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively, and a circuit for transferring a message inputted through a given one of said plural input ports to an output port designated by the modified transfer destination address outputted from said address modifying circuit provided in association with said given input port, wherein each of said address modifying circuits includes an arithmetic operation circuit for determining the transfer destination address contained in the message inputted through the input port associated with said address modifying circuit and an address modifying value predetermined for the associated input port by a plurality of logically split switch circuits resulting from a logical partition of said switch circuit, and performing an arithmetic operation on said transfer destination address and said address modifying value to obtain a modified transfer destination address for the one of the logically split switch circuits corresponding to said address modifying circuit.

2. A parallel processor system according to claim 1, wherein said address modifying value identifies a leading one of a plurality of output ports which belongs to said one of the logically split switch circuits corresponding to said associated input port, and wherein said arithmetic operation circuit incorporated in each of said address modifying circuits is constituted by an addition circuit.

3. A parallel processor system according to claim 1, wherein said switch circuit is comprised of a crossbar switch.

4. A parallel processor system, comprising:

a plurality of processors; and a plurality of switch circuits each having a plurality of input ports and a plurality of output ports for transferring in parallel a plurality of messages sent from said plurality of processors;

wherein each of said switch circuits includes:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively; and a circuit for transferring the message inputted through a given one of said plural input ports to an output port designated by the modified transfer destination address outputted from said address modifying circuit provided in association with said given input port;

wherein each of said address modifying circuits includes a circuit for modifying a transfer destination address contained in a message inputted to the input port associated with said each address modifying circuit with an address modifying value, given by a number of valid digits required for expressing the identification numbers of said plurality of output ports, respectively and determined by a plurality of logically split switch circuits resulting from a logical partition of said switch circuit, to obtain a modified transfer destination address for the logically split switch circuit corresponding to said address modifying circuit.

5. A switch circuit having a plurality of input ports and a plurality of output ports for transferring in parallel a plurality of messages between said input ports and said output ports and operating as a plurality of logically split switches, comprising:

a plurality of address modifying circuits provided in correspondence to said plurality of input ports, respectively, for modifying transfer destination addresses which designate transfer destination output ports in one of said plurality of logically split switches with an address modifying value, said addresses being contained in said messages inputted through the corresponding input ports, respectively; and a transfer circuit for transferring the message inputted through a given one of said plural input ports to an output port designated by the modified transfer destination address outputted from said address modifying circuit for said one logically split switch provided in association with said given input port.

6. A parallel processor system according to claim 4, wherein said switch circuit is comprised of a crossbar switch.

7. A parallel processor system, comprising:

a plurality of processors; and a plurality of switch circuits each having a plurality of input ports and a plurality of output ports for transferring in parallel a plurality of messages sent from said plurality of processors;

wherein each of said switch circuits includes:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively; and a circuit for transferring the message inputted through a given one of said plural input ports to an output port designated by the modified transfer destination address outputted from said address modifying circuit provided in association with said given input port;

wherein each of said address modifying circuits includes:

a register for holding an identification number of a leading one of plural output ports which belong to one of a plurality of logically split switch circuits to which the input port corresponding to said each address modifying circuit belongs, said logically split switch circuits being obtained by logically partitioning correspondingly said switch circuit; and a circuit for generating a modified transfer destination address for said one logically split switch circuit by modifying a transfer destination address contained in a message inputted to the input port corresponding to said address modifying circuit with said identification number held by said register, said modified transfer destination address being given by a number of valid digits required for expressing identification numbers of said plural output ports, respectively, of said switch circuit.

8. A parallel processor system according to claim 7, wherein:

said switch circuits are a plurality of crossbar switches, each of said crossbar switches transferring a plurality of messages in parallel between said plurality of input ports and said plurality of output ports said plurality of logically split switch circuits comprise a plurality of logically split crossbar switches to which the input port corresponding to said each address modifying circuit belongs, and said one logically split switch circuit comprises a logically split crossbar switch being one of logically split crossbar switches obtained by logically partitioning correspondingly said crossbar switch; and said circuit for generating a modified transfer destination address adds the transfer destination address contained in the message inputted to the input port corresponding to said address modifying circuit with a number of valid digits required for expressing identification numbers of said plural output ports, respectively, of said crossbar switch.

9. A parallel processor system, comprising:

a plurality of processors;

and a plurality of switch circuits each having a plurality of input ports and a plurality of output ports for transferring in parallel a plurality of messages sent from said plurality of processors;

wherein each of said switch circuits includes:

a plurality of address modifying circuits provided in correspondence to said plurality of input ports, respectively, for modifying transfer destination addresses which designate transfer destination output ports in said switch circuit, said addresses being contained in said one-to-one transfer oriented messages inputted through the corresponding input ports, respectively;

a first transfer circuit for transferring the one-to-one transfer oriented message inputted through a given one of said plural input ports to an output port designated by the modified transfer destination address outputted from said address modifying circuit provided in association with said given input port;

a second transfer circuit for transferring in parallel broadcast messages inputted through a given one of said plural input ports to said plurality of output ports;

a circuit connected to said second transfer circuit for inhibiting the transfer of the input broadcast messages to the output ports other than those of the logically split switch to which said given one input port belongs, said logically split switch being one of plural logically split switches resulting from logical partition of said switch circuit; and wherein each of said address modifying circuits includes a circuit for modifying a transfer destination address contained in a message inputted to the input port associated with said each address modifying circuit with an address modifying value given by a number of valid digits required for expressing the identification numbers of said plurality of output ports, respectively, to obtain a modified transfer destination address for said one logically split switch.

10. A parallel processor system, comprising:

a plurality of processors; and a plurality of crossbar switches each having a plurality of input ports and a plurality of output ports for transferring in parallel a plurality of messages sent from said plurality of processors;

wherein each of said crossbar switch includes:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively;

a first circuit for transferring the one-to-one transfer oriented message inputted through a given one of said plural input ports to an output port designated by the modified transfer destination address outputted from said address modifying circuit provided in association with said given input port;

a second transfer circuit for transferring in parallel broadcast messages inputted through a given one of said plural input ports to said plurality of output ports;

a circuit connected to said second transfer circuit for inhibiting the transfer of the input broadcast messages to the output ports other than those of the split crossbar switch to which said given one input port belongs, said split crossbar switch being one of plural split crossbar switches resulting from partition of said crossbar switch;

said transfer circuit including a circuit for transferring broadcast messages inputted to a given one of said input ports to said plurality of output ports;

said inhibit circuit including a plurality of transfer control circuits provided in correspondence to said plurality of output ports; and wherein each of said transfer control circuits a register for holding information as to whether or not the input ports of said switch circuit belongs to the split crossbar switch to which the output port associated with said transfer control circuit belongs; and masking circuit for masking the broadcast message transferred from each of the input ports of said switch circuit in dependence on the information stored in said register in correspondence to said each input port; and wherein each of said address modifying circuits includes:

a register for holding an identification number of a leading one of plural output ports which belong to one logically split switch circuit to which the input port corresponding to said each address modifying circuit belongs, said one logically split switch circuit being one of logically split switch circuits obtained by logically partitioning correspondingly said switch circuit; and a circuit for generating a modified transfer destination address for said one logically split switch circuit by adding a transfer destination address contained in a message inputted to the input port corresponding to said address modifying circuit with said identification number held by said register, said modified transfer destination address being given by a number of valid digits required for expressing identification numbers of said plural output ports, respectively, of said switch circuit.

11. A switch circuit having a plurality of input ports and a plurality of output ports for transferring in parallel a plurality of messages between said input ports and said output ports, comprising:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively; and a circuit for transferring a message inputted through a given one of said plural input ports to an output port designated by the modified transfer destination address outputted from said address modifying circuit provided in association with said given input port;

wherein each of said address modifying circuits includes an arithmetic operation circuit for determining the transfer destination address contained in the message inputted through the input port associated with said address modifying circuit and a modifying value predetermined for the address allocated previously to the associated input port by a logical partition of said plurality of input ports and said plurality of output ports of said switch circuit into a plurality of logically split switch circuits, and performing an arithmetic operation on said transfer destination address and said modifying value to obtain a modified transfer destination address fro the one of said logically split switch circuits corresponding to said associated input port.

12. A switch circuit having a plurality of input ports and a plurality of output ports for transferring in parallel a plurality of messages between said input ports and said output ports, comprising:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively; and a circuit for transferring the message inputted through a given one of said plural input ports to an output port designated by the modified transfer destination address outputted from said address modifying circuit provided in association with said given input port;

wherein each of said address modifying circuits includes a circuit for modifying a transfer destination address contained in a message inputted to the input port associated with said each address modifying circuit with an address modifying values given by a number of valid digits required for expressing the identification numbers of said plurality of output ports, respectively and determined according to a logical partition of said plurality of input ports and said plurality of output ports into a plurality of logically split switch circuits, to obtain a modified transfer destination address for the logically split switch circuit corresponding to the associated input port.

13. A switch circuit having a plurality of input ports and a plurality of output ports for transferring in parallel a plurality of messages between said input ports and said output ports, comprising:

a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively; and a circuit for transferring the message inputted through a given one of said plural input ports to an output port designated by the modified transfer destination address outputted from said address modifying circuit provided in association with said given input port;

wherein each of said address modifying circuits includes:

a register for holding an identification number of a leading one of plural output ports which belong to one of a plurality of logically split switch circuits to which the input port corresponding to said each address modifying circuit belongs, said one split switch circuit being one of split switch circuits obtained by partitioning correspondingly said switch circuit; and a circuit for generating a modified transfer destination address for said one logically split switch circuit by modifying a transfer destination address contained in a message inputted to the input port corresponding to said address modifying circuit with said identification number held by said register, said modified transfer destination address being given by a number of valid digits required for expressing identification numbers of said plural output ports, respectively, of said switch circuit.

14. A crossbar switch having a plurality of input ports and a plurality of output ports for transferring in parallel a plurality of messages between said plurality of input ports and said plurality of output ports, comprising:

- a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively; and
- a circuit for transferring the message inputted through a given one of said plural input ports to an output port designated by the modified transfer destination address outputted from said address modifying circuit provided in association with said given input port;
- a register for holding an identification number of a leading one of plural output ports which belong to one of a plurality of logically split crossbar switches to which the input port corresponding to said each address modifying circuit belongs, said logically split crossbar switches being obtained by logically partitioning correspondingly said crossbar switch; and
- a circuit for generating a modified transfer destination address for said one of said logically split crossbar switches by adding a transfer destination address contained in a message inputted to the input port corresponding to said address modifying circuit with a number of valid digits required for expressing identification numbers of said plural output ports, respectively, of said crossbar switch.

15. A switch circuit having a plurality of input ports and a plurality of output ports for transferring in parallel a plurality of messages between said input ports and said output ports, comprising:

- a plurality of address modifying circuits provided in correspondence to said plurality of input ports, respectively, for modifying transfer destination addresses which designate transfer destination output ports in said switch circuit, said addresses being contained in said one-to-one transfer oriented messages inputted through the corresponding input ports, respectively;
- a first transfer circuit for transferring the one-to-one transfer oriented message inputted through a given one of said plural input ports to an output port designated by the modified transfer destination address outputted from said address modifying circuit provided in association with said given input port;
- a second transfer circuit for transferring in parallel broadcast messages inputted through a given one of said plural input ports to said plurality of output ports;
- a circuit connected to said second transfer circuit for inhibiting the transfer of the input broadcast messages to the output ports other than those of the logically split switch to which said given one input port belongs, said logically split switch being one of plural logically split switches resulting from logical partition of said switch circuit; and
- wherein each of said address modifying circuits includes a circuit for modifying a transfer destination address contained in a message inputted to the input port associated with said each address modifying circuit with an address modifying value given by a number of valid digits required for expressing the identification numbers of said plurality of output ports, respectively, to obtain a modified transfer destination address for said one logically split switch.

16. A crossbar switch having a plurality of input ports and a plurality of output ports for transferring in parallel a plurality of messages between said input ports and said output ports, comprising:

- a plurality of address modifying circuits provided in correspondence to said plurality of input ports, respectively, for modifying transfer destination addresses which designate transfer destination output ports in said switch circuit, said addresses being contained in said messages inputted through the corresponding input ports, respectively;
- a first circuit for transferring the one-to-one transfer oriented message inputted through a given one of said plural input ports to an output port designated by the modified transfer destination address outputted from said address modifying circuit provided in association with said given input port;
- a second transfer circuit for transferring in parallel broadcast messages inputted through a given one of said plural input ports to said plurality of output ports;
- a circuit connected to said second transfer circuit for inhibiting the transfer of the input broadcast messages to the output ports other than those of the split crossbar switch to which said given one input port belongs, said split crossbar switch being one of plural split crossbar switches resulting from partition of said crossbar switch;
- said transfer circuit including a circuit for transferring broadcast messages inputted to a given one of said input ports to said plurality of output ports;
- said inhibit circuit including a plurality of transfer control circuits provided in correspondence to said plurality of output ports; and
- wherein each of said transfer control circuits a register for holding information as to whether or not the input ports of said switch circuit belongs to the split crossbar switch to which the output port associated with said transfer control circuit belongs; and
- masking circuit for masking the broadcast message transferred from each of the input ports of said switch circuit in dependence on the information stored in said register in correspondence to said each input port; and
- wherein each of said address modifying circuits includes:
- a register for holding an identification number of a leading one of plural output ports which belong to one logically split switch circuit to which the input port corresponding to said each address modifying circuit belongs, said one logically split switch circuit being one of logically split switch circuits obtained by logically partitioning correspondingly said switch circuit; and
- a circuit for generating a modified transfer destination address for said one logically split switch circuit by adding a transfer destination address contained in a message inputted to the input port corresponding to said address modifying circuit with said identification number held by said register, said modified transfer destination address being given by a number of valid digits required for expressing identification numbers of said plural output ports, respectively, of said switch circuit.

17. A parallel processor system, comprising:
- a plurality of processors; and
- a plurality of switch circuits each having a plurality of input ports and a plurality of output ports for transferring in parallel a plurality of messages sent from said plurality of processors;

wherein each of said switch circuits includes:

an address modifying circuit connected to said plurality of input ports for modifying a transfer destination address which designates a transfer destination output port in said switch circuit with an address modifying value and outputting the modified address, said address to undergo said modification being contained in the message inputted through one of said input ports, respectively; and a circuit for transferring the message to the output port designated by said modified transfer destination address, wherein said plurality of input ports and said plurality of output ports in each of said switch circuits belong to one of plural logically partitive switch circuits resulting from logical partition of said switch circuit; and wherein said address modifying circuit includes means for outputting, as said modified transfer destination address for said one logically partitive switch circuit, a transfer destination address for transferring the inputted message to one output port which is determined by said transfer destination address contained in said inputted message, said one output port belonging to a same logically partitive switch circuit as said one input port to which said message is inputted.

18. A parallel processor system according to claim 17, wherein each of said switch circuits has a number of output ports which is greater than the number of such output ports which can be designated by a number of bits representing said transfer destination address contained in said inputted message, said modified transfer destination address including a number of bits which are required for selecting one of said output ports in each of said switch circuits.

19. A parallel processor system according to claim 17;

wherein each of said input ports and each of said output ports are previously allocated with port addresses in the partitive switch circuit to which said ports belong; and wherein said one output port is allocated with said transfer destination address contained in said inputted message as a logical port address.

20. A parallel processor system according to claim 17, wherein said address modifying circuit includes:

hold means for holding information for designating one address information to be selected from a plurality of address information constituting the transfer destination address contained in the message inputted to said each switch circuit; and means for selectively modifying one address information designated by the information held in said hold means, said one address information being one of said plurality of address information constituting the transfer destination address of said one inputted message.

21. A parallel processor system according to claim 17, wherein said address modifying circuit includes means for replacing the transfer destination address contained in said message by said modified transfer destination address; and wherein said transfer circuit includes means for responding to the message having the transfer destination address replaced, to thereby output said message selectively to one of said plurality of output ports.

22. A parallel processor system according to claim 17, wherein said address modifying circuit includes:

means for holding a partitioning number by which each of said switch circuits is to be partitioned into a plurality of logically isolated switch circuits; and means for adding the transfer destination address information having a number of bits determined by said partitioning number to the transfer destination address information contained in said inputted message.

23. A parallel processor system according to claim 17, wherein each of said switch circuits is comprised of a crossbar switch.

24. A switch circuit having a plurality of input ports and a plurality of output ports for transferring in parallel a plurality of messages between said input ports and said output ports and operating as a plurality of logically split switches, comprising:

an address modifying circuit connected to said plurality of input ports for modifying a transfer destination address which designates a transfer destination output port in one of said plurality of logically split switches with an address modifying value and outputting the modified address, said address to undergo said modification being contained in the message inputted through one of said input ports, respectively; and a circuit for transferring the message to the output port designated by said modified transfer destination address for said one logically split switch.

25. A switch circuit according to claim 24, wherein each of said switch circuits has a number of output ports which is greater than the number of such output ports which can be designated by a number of bits representing said transfer destination address contained in said inputted message, said modified transfer destination address including a number of bits which are required for selecting one of said output ports in each of said switch circuits.

26. A switch circuit according to claim 24, wherein said plurality of input ports and said plurality of output ports in each of said switch circuits belong to one of plural partitive switch circuits resulting from logical partition of said switch circuit; and wherein said address modifying circuit includes means for outputting as said transfer destination address a transfer destination address for transferring the inputted message to one output port which is determined by said transfer destination address contained in said inputted message, said one output port belonging to a same partitive switch circuit as said one input port to which said message is inputted.

27. A switch circuit according to claim 26, wherein each of said input ports and each of said output ports are previously allocated with port addresses in the partitive switch circuit to which said ports belong; and wherein said one output port is allocated with said transfer destination address contained in said inputted message as a logical port address.

28. A switch circuit according to claim 24, wherein said address modifying circuit includes:

hold means for holding information for designating one address information to be selected from a plurality of address information constituting the transfer destination address contained in the message inputted to said each switch circuit; and means for selectively modifying one address information designated by the information held in said hold means, said one address information being one of said plurality of address information constituting the transfer destination address of said one inputted message.

29. A switch circuit according to claim 24, wherein said address modifying circuit includes means for replacing the transfer destination address contained in said message by said modified transfer destination address; and wherein said transfer circuit includes means for responding to the message having the transfer destination address replaced to thereby output said message selectively to one of said plurality of output ports.

30. A switch circuit according to claim 24, wherein said address modifying circuit includes:

means for holding a partitioning number by which each of said switch circuits is to be partitioned into a plurality of logically isolated switch circuits; and means for adding the transfer destination address information having a number of bits determined by said partitioning number to the transfer destination address information contained in said inputted message.

31. A switch circuit according to claim 24, wherein each of said switch circuits is comprised of a crossbar switch.

\* \* \* \* \*